(12) United States Patent
Sanz-Robinson et al.

(10) Patent No.: US 12,468,782 B2
(45) Date of Patent: Nov. 11, 2025

(54) FORCE SENSOR SAMPLE CLASSIFICATION

(71) Applicant: Cirrus Logic International Semiconductor Ltd., Edinburgh (GB)

(72) Inventors: Josh Sanz-Robinson, Austin, TX (US); Siddharth Maru, Austin, TX (US); Rahul Gawde, Lakeway, TX (US); Jon D. Hendrix, Wimberley, TX (US); Eric Lindemann, Boulder, CO (US); Pablo Peso Parada, London (GB)

(73) Assignee: Cirrus Logic Inc., Austin, TX (US)

( * ) Notice: Subject to any disclaimer, the term of this patent is extended or adjusted under 35 U.S.C. 154(b) by 1179 days.

(21) Appl. No.: 17/212,880

(22) Filed: Mar. 25, 2021

(65) Prior Publication Data

US 2022/0198227 A1   Jun. 23, 2022

Related U.S. Application Data

(63) Continuation-in-part of application No. 17/128,859, filed on Dec. 21, 2020, now abandoned.

(51) Int. Cl.
*G06F 18/24* (2023.01)
*G01L 1/14* (2006.01)
(Continued)

(52) U.S. Cl.
CPC ............. *G06F 18/24* (2023.01); *G01L 1/14* (2013.01); *G06F 18/254* (2023.01); *H03K 17/96* (2013.01); *H03K 2217/96038* (2013.01)

(58) Field of Classification Search
CPC ...... G06F 18/24; G06F 18/254; G06F 1/1626; G06F 1/169; G01L 1/14; H03K 17/96;
(Continued)

(56) References Cited

U.S. PATENT DOCUMENTS 8,763,476 B2 * 7/2014 Woodcock .............. G01L 1/242
                                                          73/862.624
9,164,605 B1 * 10/2015 Pirogov .............. G06F 3/04144
(Continued)

OTHER PUBLICATIONS

International Search Report and Written Opinion of the International Searching Authority, International Application No. PCT/GB2021/053338, mailed Mar. 21, 2022.
(Continued)

*Primary Examiner* — Grant Sitta
(74) *Attorney, Agent, or Firm* — Jackson Walker L.L.P.

(57) ABSTRACT

A classification system for classifying sensor samples in a sensor system, the sensor system comprising N force sensors each configured to output a sensor signal, where $N \geq 1$, each sensor sample comprising N sample values from the N sensor signals, respectively, the classification system comprising: a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; a determiner configured to output at least one event determination based on the series of classification results; and a controller configured to control the classifier and/or the determiner based on one or more controller input signals.

19 Claims, 12 Drawing Sheets

(51) Int. Cl.
*G06F 18/25* (2023.01)
*H03K 17/96* (2006.01)

(58) Field of Classification Search
CPC .. H03K 2217/96038; G06N 3/08; G06N 5/01; G06N 20/00
See application file for complete search history.

(56) References Cited

U.S. PATENT DOCUMENTS

| | | | | |
|---|---|---|---|---|
| 10,860,202 | B2 * | 12/2020 | Sepehr | G06F 3/0488 |
| 2010/0134424 | A1 * | 6/2010 | Brisebois | G06F 3/0488 |
| | | | | 345/173 |
| 2012/0105368 | A1 * | 5/2012 | Kobayashi | G06F 3/0416 |
| | | | | 345/174 |
| 2015/0242009 | A1 * | 8/2015 | Xiao | G06F 18/23213 |
| | | | | 345/174 |
| 2015/0293695 | A1 * | 10/2015 | Schönleben | G06F 3/0412 |
| | | | | 345/173 |
| 2015/0346897 | A1 * | 12/2015 | Irri | G06F 3/04186 |
| | | | | 345/175 |
| 2019/0064984 | A1 * | 2/2019 | Schwartz | G06F 3/04883 |
| 2019/0347479 | A1 * | 11/2019 | Sakuma | G06F 3/0354 |
| 2020/0193597 | A1 * | 6/2020 | Fan | H04N 25/135 |
| 2020/0310579 | A1 * | 10/2020 | Peso Parada | G06F 3/04164 |
| 2020/0313672 | A1 * | 10/2020 | Peso Parada | G06F 3/044 |
| 2020/0356210 | A1 | 11/2020 | Stone et al. | |
| 2021/0034213 | A1 * | 2/2021 | Sepehr | G06F 3/0412 |
| 2021/0405840 | A1 * | 12/2021 | Sepehr | G06F 3/0488 |

OTHER PUBLICATIONS

International Search Report and Written Opinion of the International Searching Authority, International Application No. PCT/GB2021/053340, mailed Mar. 29, 2022.

* cited by examiner

Fig. 2
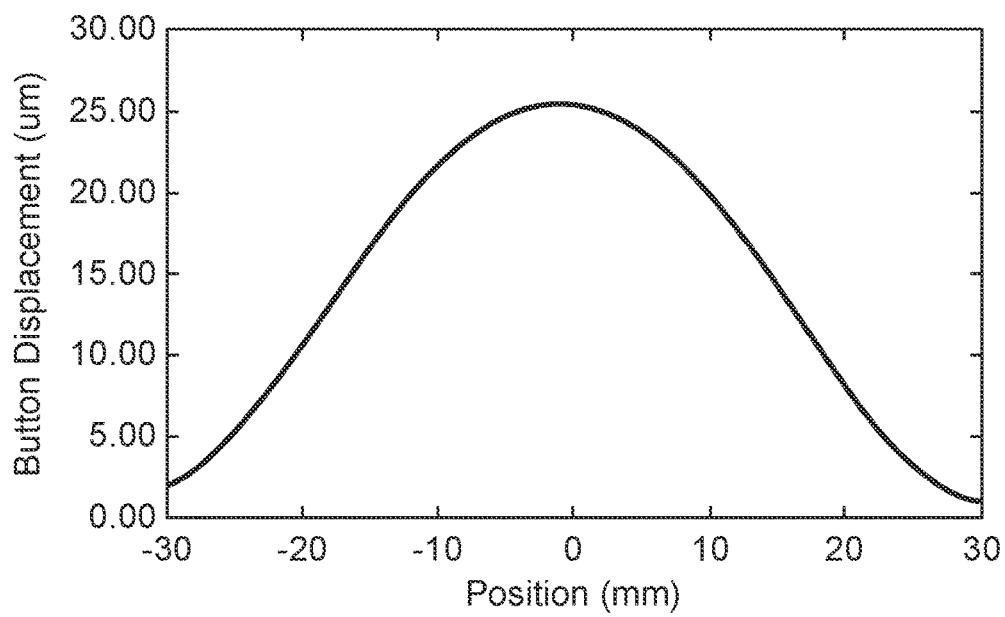
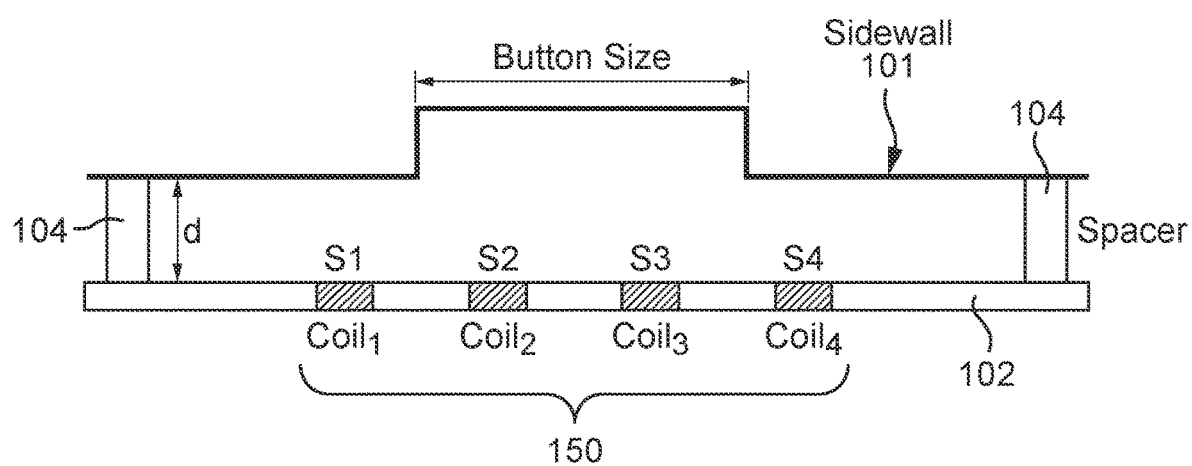

Fig. 5
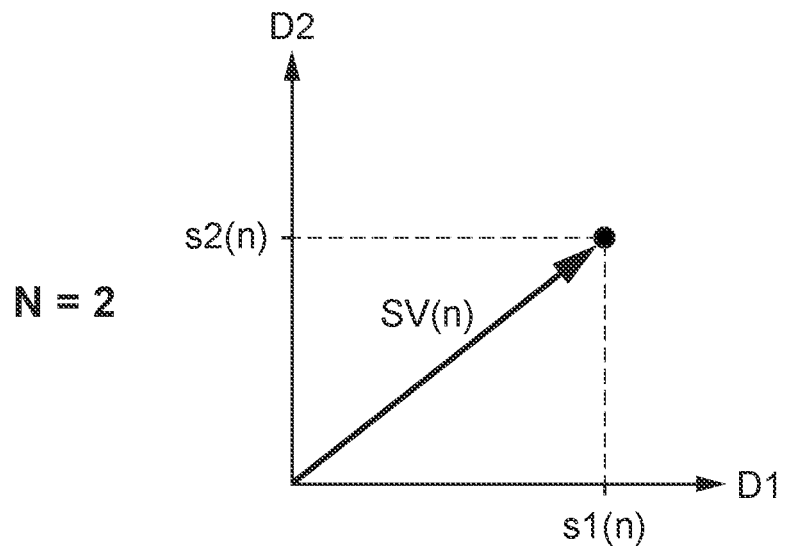
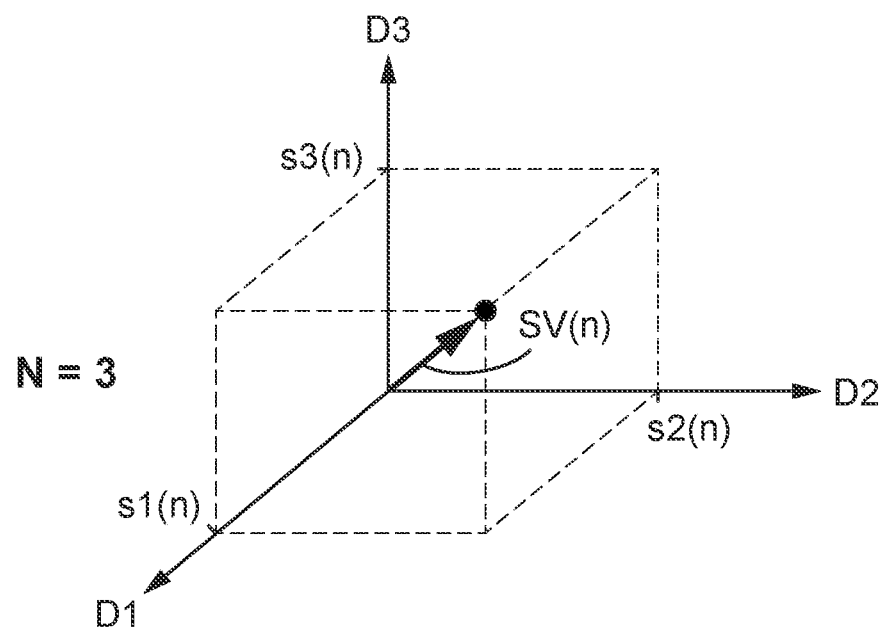

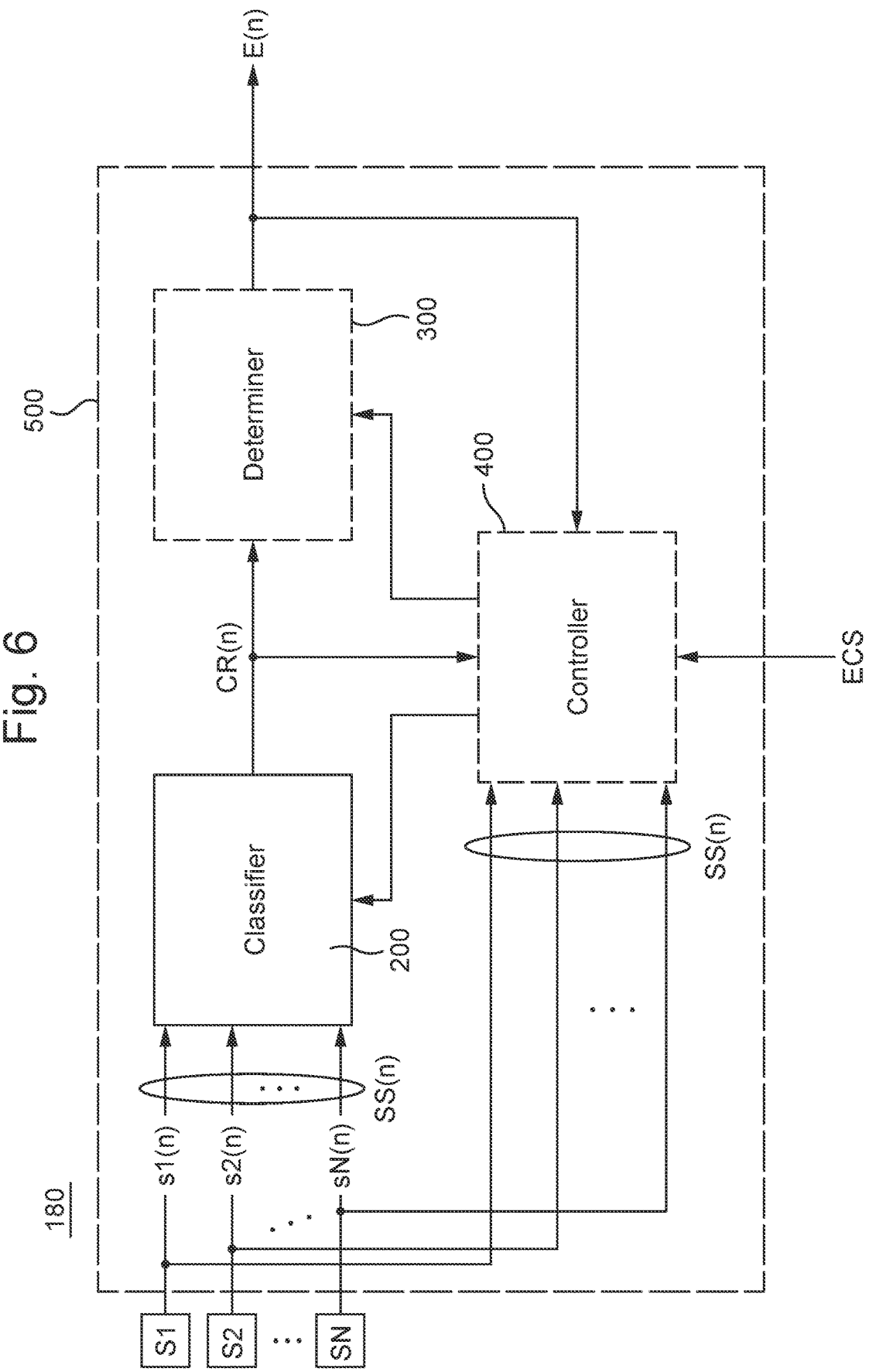

Fig. 7

$$\text{Normalized Difference Feature} = \frac{y_{coil\_1}(t) - y_{coil\_2}(t)}{\max(y_{coil\_1}(t), y_{coil\_2}(t))}$$

| Criteria for State to be Active | Coil Difference |
|---|---|
| Top Button | $\text{Difference\_Threshold}_{Top\_Button\_Lower} < \dfrac{y_{coil\_1}(t) - y_{coil\_2}(t)}{\max(y_{coil\_1}(t), y_{coil\_2}(t))} < \text{Difference\_Threshold}_{Top\_Button\_Upper}$ |
| Center Button | $\text{Difference\_Threshold}_{Center\_Button\_Lower} < \dfrac{y_{coil\_1}(t) - y_{coil\_2}(t)}{\max(y_{coil\_1}(t), y_{coil\_2}(t))} < \text{Difference\_Threshold}_{Center\_Button\_Upper}$ |
| Bottom Button | $\text{Difference\_Threshold}_{Bottom\_Button\_Lower} < \dfrac{y_{coil\_1}(t) - y_{coil\_2}(t)}{\max(y_{coil\_1}(t), y_{coil\_2}(t))} < \text{Difference\_Threshold}_{Bottom\_Button\_Upper}$ |
| Top External | $\text{Difference\_Threshold}_{Top\_External\_Lower} < \dfrac{y_{coil\_1}(t) - y_{coil\_2}(t)}{\max(y_{coil\_1}(t), y_{coil\_2}(t))} < \text{Difference\_Threshold}_{Top\_External\_Upper}$ |
| Bottom External | $\text{Difference\_Threshold}_{Bottom\_External\_Lower} < \dfrac{y_{coil\_1}(t) - y_{coil\_2}(t)}{\max(y_{coil\_1}(t), y_{coil\_2}(t))} < \text{Difference\_Threshold}_{Bottom\_External\_Upper}$ |

FORCE SENSOR SAMPLE CLASSIFICATION

FIELD OF DISCLOSURE

The present disclosure relates to classification systems for classifying sensor samples in a sensor system, and to components of such classification systems. Such sensor systems may in particular comprise force sensors.

A classifier may be provided for use in such a sensor system to classify sensor samples.

BACKGROUND

Force sensors and sensor systems having force sensors may be provided for use with, or as part of, a host device. A host device having force sensors may be referred to as a sensor system or force sensor system.

In this context, a host device may be considered an electrical or electronic device and may be a mobile device. Example devices include a portable and/or battery powered host device such as a mobile telephone or smartphone, an audio player, a video player, a PDA, a mobile computing platform such as a laptop computer or tablet and/or a games device.

In general, a force sensor is configured to output a sensor signal indicative of a temporary mechanical distortion of a material under an applied force. The material may for example be a metal plate which is part of, or associated with, the force sensor, and which is pushed/pressed or otherwise deformed by a user. In the context of a host device, the material may be part of a chassis or external casing of the device. The force may for example be applied and subsequently reduced or removed in a user press operation, referred to as a button press where the force sensor is used to implement a button, the user press operation starting when the force is applied.

Force sensing may be carried out by a variety of different types of force sensor. Example types of force sensor include capacitive displacement sensors, inductive force sensors, strain gauges, piezoelectric force sensors, force sensing resistors, piezoresistive force sensors, thin film force sensors and quantum tunneling composite-based force sensors. Force sensor systems having multiple force sensors may comprise a mixture of types of sensor/sensor technology.

Modern electronic devices are increasingly using "virtual button" technology to replace traditional push buttons. An example is the volume or power button on the side of a smartphone. The traditional buttons have contacts that can age and wear, and virtual buttons not only avoid this problem, but can be made without introducing openings in the smartphone chassis, thus increasing waterproofing and reducing general exposure to dirt and grease.

To replace physical buttons, virtual buttons are implemented using a number of force sensors in a force sensor system as described above. In the context of a smartphone, as a convenient running example of a host device, a number of such sensors may be arranged on the inside of the chassis (on any of the sides)—e.g. on the inside left-side and/or right-side edges or on the front or back of the device. The sensors are then responsive to physical pressure applied to the chassis.

Generally, the objective is to define a certain region of the device chassis as corresponding to a virtual button, and to use sensor information to determine when that region of the chassis has enough applied force to constitute an associated button press. Often multiple regions are defined corresponding respectively to multiple virtual buttons.

In general, N sensors may be arranged at various locations on the inside of the chassis, and it may be desirable to detect M virtual button presses corresponding to M regions on the outside of the chassis.

Such systems may be subject to noise and non-linearities. In another example, the user might pinch, squeeze, or bend the device chassis. This action may result in responses from the various sensors, and, some of these responses may be interpreted, erroneously, as button presses.

A need exists, given N sensors and M virtual buttons, where $N \geq 1$ and $M \geq 1$, to use the information available from the N sensors to classify sensor responses as corresponding to valid virtual button presses and not anomalies in a robust manner.

It is desirable to address some or all of the above problems, or problems described later herein. It is desirable to provide improved classification systems for classifying sensor samples in a sensor system, improved components of such classification systems, and associated methods and computer programs.

SUMMARY

According to a first aspect of the present disclosure, there is provided a classification system for classifying sensor samples in a sensor system, the sensor system comprising N force sensors each configured to output a sensor signal, where $N \geq 1$, each sensor sample comprising N sample values from the N sensor signals, respectively, the classification system comprising: a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; a determiner configured to output at least one event determination based on the series of classification results; and a controller configured to control the classifier and/or the determiner based on one or more controller input signals.

According to a second aspect of the present disclosure, there is provided a classification system for classifying sensor samples in a sensor system, the sensor system comprising N force sensors each configured to output a sensor signal, where $N \geq 1$, each sensor sample comprising N sample values from the N sensor signals, respectively, the classification system comprising a classifier and a determiner, wherein: the classifier is configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; and the determiner is configured to output at least one event determination based on the series of classification results, and to determine each event determination based on a plurality of the classification results.

According to a third aspect of the present disclosure, there is provided a classification system for classifying sensor samples in a sensor system, the sensor system comprising N force sensors each configured to output a sensor signal, where $N \geq 1$, each sensor sample comprising N sample values from the N sensor signals, respectively, the classification system comprising a classifier and a controller, wherein: the classifier is configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; and the controller is configured to control the classifier based on one or more controller input signals.

According to a fourth aspect of the present disclosure, there is provided a sensor sample transformer for use in a classification system, the classification system for classifying sensor samples in a sensor system, the sensor system comprising N force sensors each configured to output a sensor signal, where $N \geq 1$, each sensor sample comprising N sample values from the N sensor signals, respectively, the classification system comprising: a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively, wherein: the classifier is configured for operation at at least one configuration value of a reference signal; said sensor samples are untransformed sensor samples; the sensor sample transformer is configured, based on a current value of the reference signal, to generate transformed sensor samples by transforming the untransformed sensor samples to reduce a difference between: the transformed sensor samples and/or the classification results generated therefrom; and corresponding untransformed sensor samples and/or classification results, respectively, expected when the reference signal has the configuration value in respect of which the classifier is operating; and the classifier is configured, for each of the series of candidate sensor samples, to perform the classification operation based on the corresponding transformed sensor sample.

According to a fifth aspect of the present disclosure, there is provided a classification result transformer for use in a classification system, the classification system for classifying sensor samples in a sensor system, the sensor system comprising N force sensors each configured to output a sensor signal, where $N \geq 1$, each sensor sample comprising N sample values from the N sensor signals, respectively, the classification system comprising: a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively, wherein: the classifier is configured for operation at at least one configuration value of a reference signal; said classification results are untransformed classification results; and the classification result transformer is configured, based on a current value of the reference signal, to generate transformed classification results by transforming the untransformed classification results to reduce a difference between: the transformed classification results; and corresponding untransformed classification results expected when the reference signal has the configuration value in respect of which the classifier is operating.

According to a sixth aspect of the present disclosure, there is provided an event determination transformer for use in a classification system, the classification system for classifying sensor samples in a sensor system, the sensor system comprising N force sensors each configured to output a sensor signal, where $N \geq 1$, each sensor sample comprising N sample values from the N sensor signals, respectively, the classification system comprising: a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; and a determiner configured to output at least one event determination based on the series of classification results, wherein: the classifier is configured for operation at at least one configuration value of a reference signal; said at least one event determination is an untransformed event determination; and the event determination transformer is configured, based on a current value of the reference signal, to generate at least one transformed event determination by transforming the at least one untransformed event determination to reduce a difference between: the at least one transformed event determination; and a corresponding at least one untransformed event determination expected when the reference signal has the configuration value in respect of which the classifier is operating.

According to a seventh aspect of the present disclosure, there is provided a combination transformer for use in a classification system, the classification system for classifying sensor samples in a sensor system, the sensor system comprising N force sensors each configured to output a sensor signal, where $N \geq 1$, each sensor sample comprising N sample values from the N sensor signals, respectively, the classification system comprising: a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively, wherein: the classifier is configured for operation at at least one configuration value of a reference signal; said sensor samples are untransformed sensor samples; said classification results are untransformed classification results; the combination transformer is configured, based on a current value of the reference signal, to generate transformed sensor samples by transforming the untransformed sensor samples and/or to generate transformed classification results by transforming the untransformed classification results to reduce a difference between: the transformed sensor samples and/or the transformed classification results generated therefrom; and corresponding untransformed sensor samples and/or untransformed classification results, respectively, expected when the reference signal has the configuration value in respect of which the classifier is operating; and the classifier is configured, for each of the series of candidate sensor samples, to perform the classification operation based on the corresponding transformed sensor sample.

According to an eighth aspect of the present disclosure, there is provided a classification system for classifying sensor samples in a sensor system, the sensor system comprising N force sensors each configured to output a sensor signal, where $N \geq 1$, each sensor sample comprising N sample values from the N sensor signals, respectively, the classification system comprising: a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; a determiner configured to output at least one event determination based on the series of classification results; and a controller configured to control the classifier and/or the determiner based on one or more controller input signals, wherein: the classifier is configured for operation at at least one configuration value of a reference signal, the reference signal comprising or derived from at least one controller input signal; and the controller is configured, based on a current value of the reference signal, to control the classifier and/or the determiner to cause the determiner to output the at least one event determination based selectively or only on classification results generated when the current value of the reference signal is substantially at, or within a defined configuration range of, the configuration value in respect of which the classifier is operating, optionally wherein the configuration range spans ±1% or ±5% or ±10% or ±20 of the configuration value.

According to a ninth aspect of the present disclosure, there is provided a sensor system or a host device, comprising: the classification system according to any of the preceding aspects; and the N force sensors.

According to a tenth aspect of the present disclosure, there is provided a sensor system or a host device, comprising the classification system, sensor sample transformer, classification result transformer, event determination transformer or combination transformer of any of the aforementioned first to eighth aspects.

Also envisaged are corresponding method aspects, computer program aspects and storage medium aspects. Features of one aspect may be applied to another and vice versa.

BRIEF DESCRIPTION OF THE DRAWINGS

Reference will now be made, by way of example only, to the accompanying drawings, of which:

FIG. 2 is a schematic diagram of a portion of the host device of FIG. 1, along with a related graph;

FIG. 5 is useful for understanding the sensor samples may be taken to define sample vectors;

FIG. 6 is a schematic diagram of a classification system according to an embodiment;

FIG. 7 is an example definition of a rule-based classifier;

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
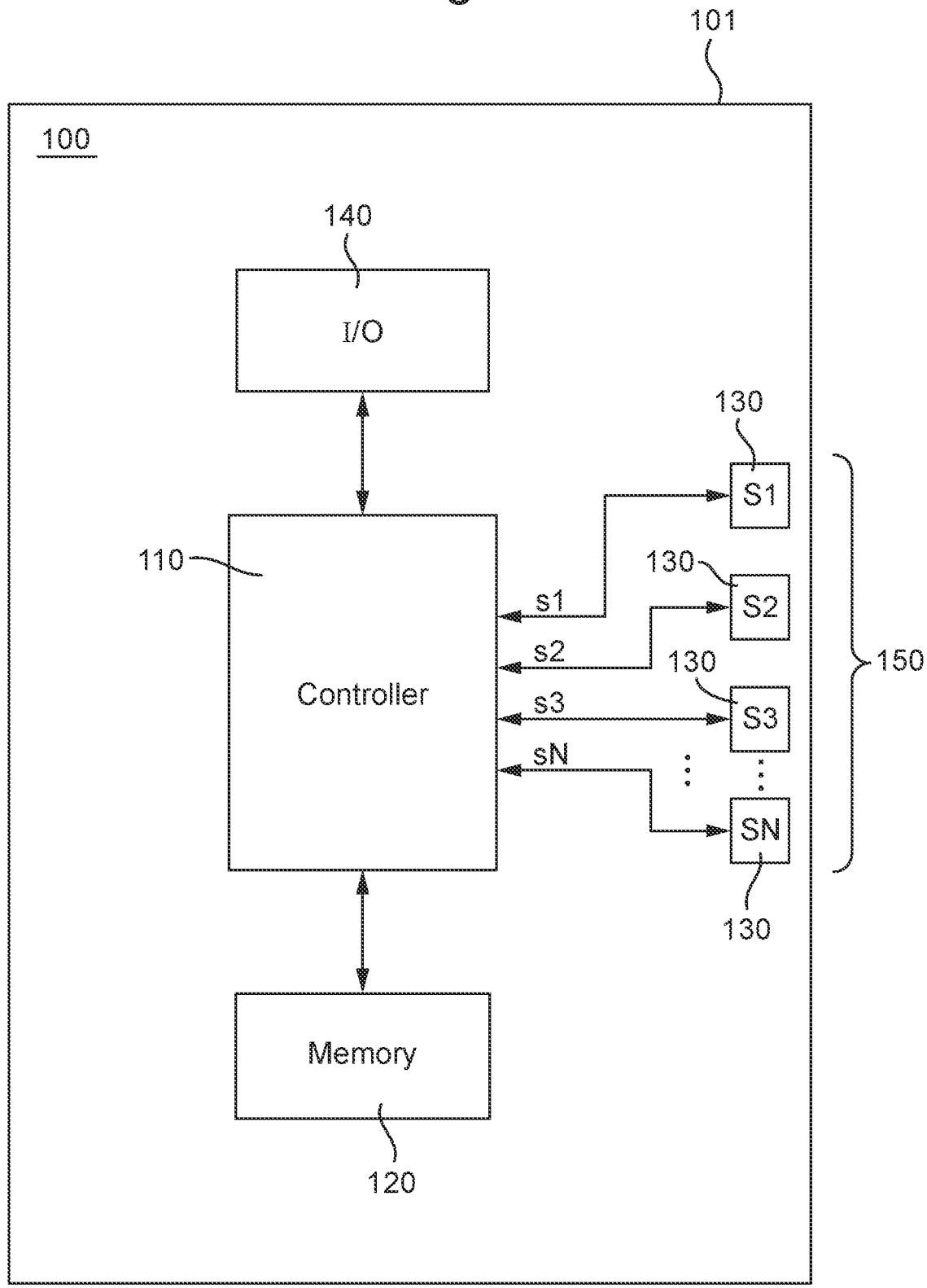
FIG. 1 is a schematic diagram of a host device according to an embodiment.

FIG. 1 is a schematic diagram of a host device 100 according to an embodiment, for example a mobile or portable electrical or electronic device. Example host devices 100 include a portable and/or battery powered host device such as a mobile telephone, a smartphone, an audio player, a video player, a PDA, a mobile computing platform such as a laptop computer or tablet and/or a games device.

As shown in FIG. 1, the host device 100 may comprise an enclosure 101, a controller 110, a memory 120, N force sensors 130, where N≥1, and an input and/or output unit (I/O unit) 140. Although generally herein N≥1 (i.e. one or more), for some arrangements considered herein N≥1 (i.e. two or more). For convenience, force sensors 130 will be referred to herein in the plural however it will be recalled that in some arrangements N=1.

The enclosure 101 may comprise any suitable housing, casing, chassis or other enclosure for housing the various components of host device 100. Enclosure 101 may be constructed from plastic, metal, and/or any other suitable materials. In addition, enclosure 101 may be adapted (e.g., sized and shaped) such that host device 100 is readily transported by a user (i.e. a person).

Controller 110 may be housed within enclosure 101 and may include any system, device, or apparatus configured to control functionality of the host device 100, including any or all of the memory 120, the force sensors 130, and the I/O unit 140. Controller 110 may be implemented as digital or analogue circuitry, in hardware or in software running on a processor, or in any combination of these.

Thus controller 110 may include any system, device, or apparatus configured to interpret and/or execute program instructions or code and/or process data, and may include, without limitation a processor, microprocessor, microcontroller, digital signal processor (DSP), application specific integrated circuit (ASIC), FPGA (Field Programmable Gate Array) or any other digital or analogue circuitry configured to interpret and/or execute program instructions and/or process data. Thus the code may comprise program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware. Processor control code for execution by the controller 110, may be provided on a non-volatile carrier medium such as a disk, CD- or DVD-ROM, programmed memory such as read only memory (Firmware), or on a data carrier such as an optical or electrical signal carrier. The controller 110 may be referred to as control circuitry and may be provided as, or as part of, an integrated circuit such as an IC chip.

Memory 120 may be housed within enclosure 101, may be communicatively coupled to controller 110, and may include any system, device, or apparatus configured to retain program instructions and/or data for a period of time (e.g., computer-readable media). In some embodiments, controller 110 interprets and/or executes program instructions and/or processes data stored in memory 120 and/or other computer-readable media accessible to controller 110.

The force sensors 130 are housed within the enclosure 101, and are communicatively coupled to the controller 110. Each force sensor 130 may include any suitable system, device, or apparatus for sensing a force, a pressure, or a touch (e.g., an interaction with a human finger) and for generating an electrical or electronic signal in response to such force, pressure, or touch. Example force sensors 130 include or comprise capacitive displacement sensors, inductive force sensors, strain gauges, piezoelectric force sensors, force sensing resistors (resistive force sensors), piezoresistive force sensors, thin film force sensors and quantum tunneling composite-based force sensors. There may be a mixture of types of force sensor amongst force sensors 130, where N≥1.

In some arrangements, the electrical or electronic signal generated by a force sensor 130 may be a function of a magnitude of the force, pressure, or touch applied to the force sensor (a user force input) via the enclosure 101. Such electronic or electrical signal may comprise a general purpose input/output signal (GPIO) associated with an input signal in response to which the controller 100 controls some functionality of the host device 100. The term "force" as used herein may refer not only to force, but to physical quantities indicative of force or analogous to force such as, but not limited to, pressure and touch.

The I/O unit 140 may be housed within enclosure 101, may be distributed across the host device 100 (i.e. it may represent a plurality of units) and may be communicatively coupled to the controller 110. Although not specifically shown in FIG. 1, the I/O unit 140 may comprise any or all of a microphone, an LRA (or other device capable of outputting a force, such as a vibration), a radio (or other electromagnetic) transmitter/receiver, a speaker, a display screen (optionally a touchscreen), an indicator (such as an LED), a sensor (e.g. accelerometer, temperature sensor, gyroscope, camera, tilt sensor, electronic compass, etc.) and one or more buttons or keys.

As a convenient example to keep in mind, the host device 100 may be a haptic-enabled device. As is well known, haptic technology recreates the sense of touch by applying forces, vibrations, or motions to a user. The host device 100 for example may be considered a haptic-enabled device (a device enabled with haptic technology) where its force sensors 130 (input transducers) measure forces exerted by the user on a user interface (such as a button or touchscreen on a mobile telephone or tablet computer), and an LRA or other output transducer of the I/O unit 140 applies forces directly or indirectly (e.g. via a touchscreen) to the user, e.g. to give haptic feedback. Some aspects of the present disclosure, for example the controller 110 and/or the force sensors 130, may be arranged as part of a haptic circuit, for instance a haptic circuit which may be provided in the host device 100. A circuit or circuitry embodying aspects of the present disclosure (such as the controller 110) may be implemented (at least in part) as an integrated circuit (IC), for example on an IC chip. One or more input or output transducers (such as the force sensors 130 or an LRA) may be connected to the integrated circuit in use.

Of course, this application to haptic technology is just one example application of the host device 100 comprising the plurality of force sensors 130. The force sensors 130 may simply serve as generic input transducers to provide input signals to control other aspects of the host device 100, such as a GUI (graphical user interface) displayed on a touchscreen of the I/O unit 140 or an operational state of the host device 100 (such as waking components from a low-power "sleep" state).

The host device 100 is shown comprising N force sensors 130, labelled S1 to SN, with their signals labelled s1 to sN, respectively. Although four sensors are shown explicitly, it will be understood that this is just a convenient example. The host device 100 generally need only comprise a single force sensor 130 (i.e. N=1) in connection with the techniques described herein, although N=2, N=3, N=4 or N=7 may be considered advantageous in some arrangements. It may be said that N≥2 is a preferable configuration and that still preferably N≥4. Generally, the larger the value of N the greater the possibility of distinguishing a button press for one virtual button from that for another, and the greater the number of virtual buttons that may be adequately defined. However, the larger the value of N the greater the number of sensor signals and thus the greater the complexity in handling them all.

Although FIG. 1 is schematic, it will be understood that the sensors S1 to SN are located so that they can receive force inputs from a user, in particular a user hand or finger, during use of the host device 100. A particular user force input of interest in this context corresponds to a user touching, pushing, or pressing a virtual button, or swiping the device corresponding to time-staggered virtual button presses. A change in the amount of force applied may be detected, rather than an absolute amount of force detected, for example.

Thus, the force sensors S1 to SN may be located on the host device 100 according to anthropometric measurements of a human hand (e.g. so that a single human hand will likely apply a force to multiple force sensors). For example, the force sensors S1 to SN may be provided on the same side of the host device 100. Merely as a running example, it will be understood that the force sensors S1 to SN are provided in a linear array 150 as indicated in FIG. 1. The force sensors 130 are provided at different locations on the device, but may be in close proximity to one another.

As a concrete example, FIG. 2 is a schematic diagram of a portion of the enclosure 101 of the host device 100, which serves as a sidewall of the host device 100 and alongside which a linear array 150 of force sensors 130, S1 to S4, is mounted. In this example, the force sensors 130 are implemented as inductive force sensors and thus comprise respective coils ($coil_1$ to $coil_4$) disposed on a circuit board 102 which is spaced apart from the sidewall 101 by spacers 104.

Here, the sidewall 101 has been shaped adjacent the linear array 150 of force sensors 130, S1 to S4, to form a physical button shape having a button size (e.g. 10 to 60 mm). Also, the sidewall 101 is assumed to comprise a metal plate. When subjected to a force, the metal sidewall 101 of the device 100 is deflected. The changing distance d from the coils affects (i.e. changes) respective circuit inductances which can be measured as representative of an applied force. That is, a change in the distance d between a metal "plate" from the sidewall 101 and a coil is detected as a change of inductance. As indicated in the graph of FIG. 2, the displacement of the button may vary with position relative to the position of the applied force. For example, in FIG. 2 it is assumed that a (constant) force is applied at position 0 mm and that the physical displacement of the button (i.e. of the metal plate, or sidewall 101), relative to when the force is not applied, is measured at the range of positions shown. Sensors 130 may be considered strongly mechanically coupled/correlated by virtue of the shared sidewall 101, as apparent in FIG. 2.

Figure 3:
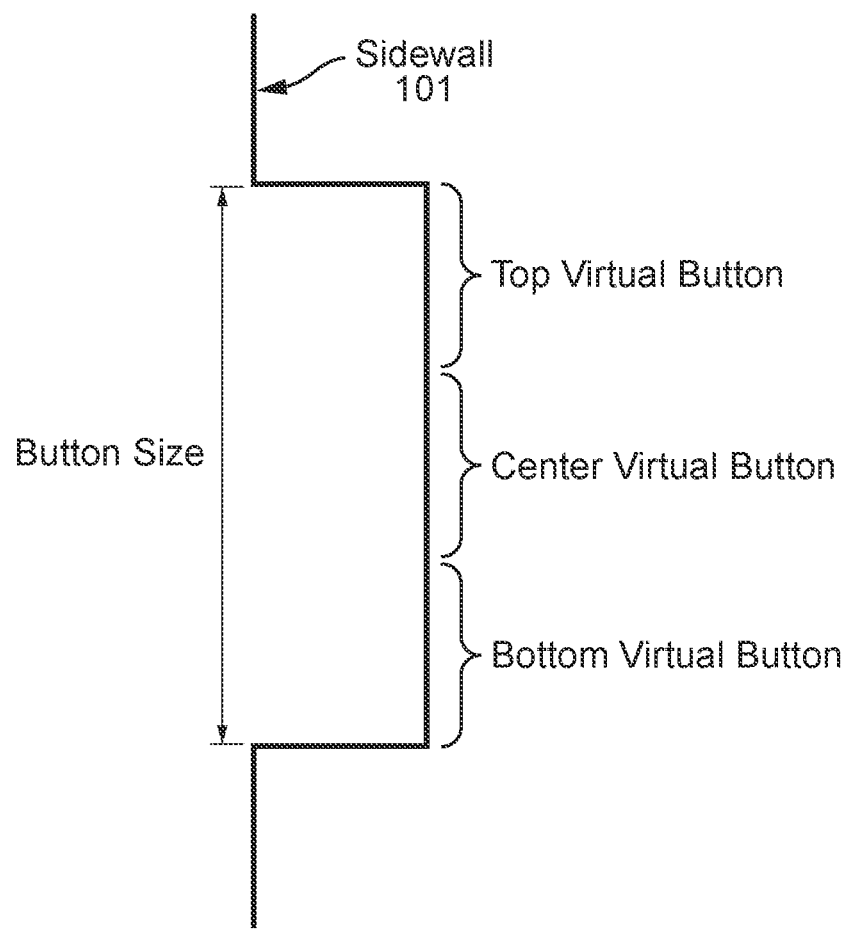
FIG. 3 is a schematic diagram corresponding to that of FIG. 2, useful for understanding virtual buttons.

FIG. 3 is a schematic diagram of the same portion of the sidewall (enclosure) 101 of the host device 100 as in FIG. 2, omitting the force sensors 130, S1 to S4, for simplicity, and orientated vertically to better correspond to the linear array 150 of FIG. 1. As indicated, top, center and bottom regions of the physical button are defined as corresponding to top, center and bottom virtual buttons, respectively. Thus, for example, the application of a force in the top region of the physical button may be detected and determined to correspond to the push or press of the top virtual button. In some cases, the number N of sensors 130 may be less than number of virtual buttons (or positions) due to physical space limitations, number of channels available, etc.

In general, an objective may be taken as to map the signal from one or more sensors 130 to a "discrete" button press state. For example, even when N=2, it may be possible to distinguish between top, center and bottom virtual button presses in line with FIG. 3. Button press states may comprise pressing on a single physical region (e.g. center) of a button (corresponding to a single virtual button press), pressing simultaneously on multiple physical regions of the button (e.g. corresponding to multiple virtual button presses—e.g. center and bottom at the same time). Gestures on the physical button may also be detected (e.g. swiping upwards). An anomaly affecting the sensor/s associated with the button (e.g. twisting the host device 100) may also be detected.

Figure 4:
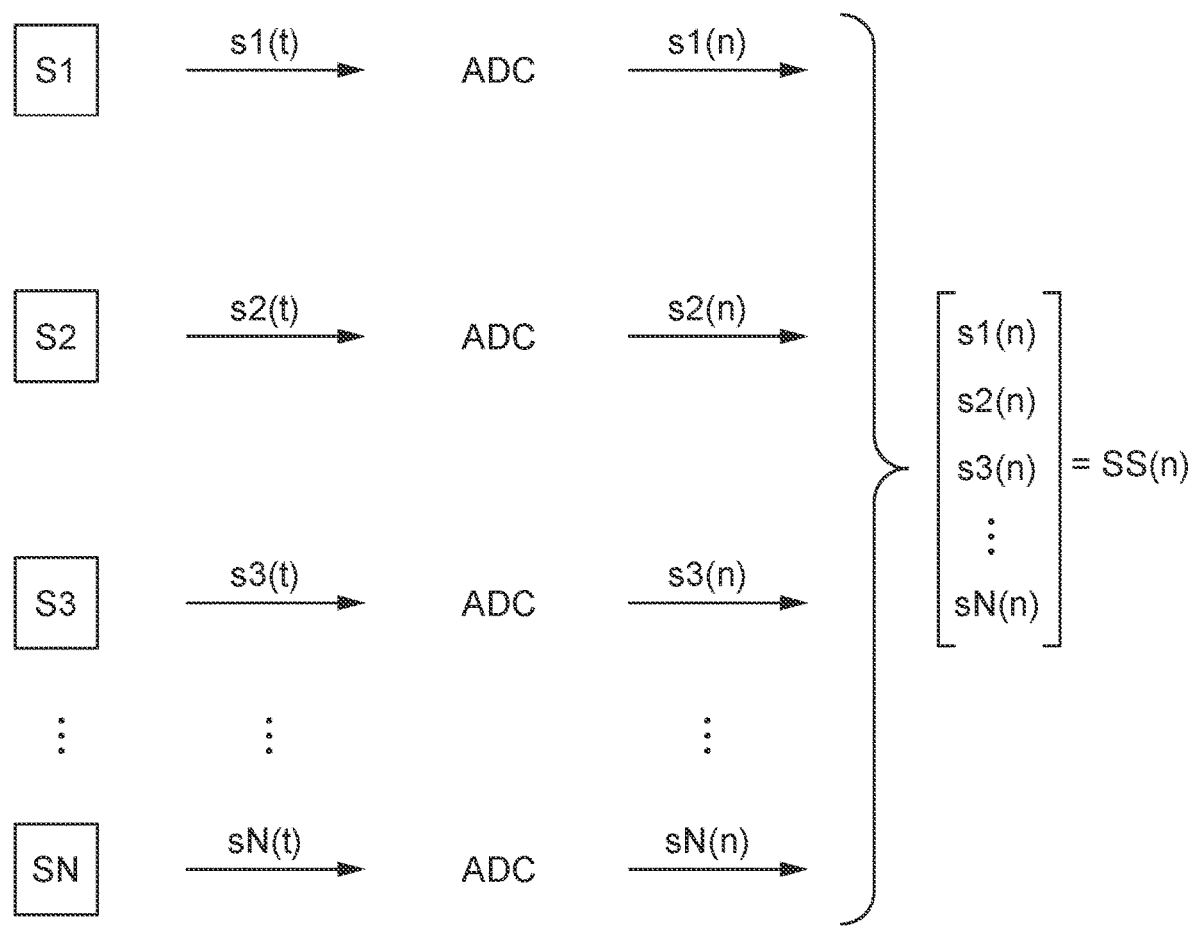
FIG. 4 is a schematic diagram indicating how signals from force sensors of the host device may be arranged and handled.

FIG. 4 is a schematic diagram indicating how the signals from the force sensors S1 to SN may be arranged and handled.

Depending on how the force sensors 130 are configured, the force sensors S1 to SN may provide analogue signals $s1(t)$ to $sN(t)$, respectively, where t is time e.g. in seconds. These analogue signals may then be converted by analogue-to-digital conversion, ADC, to corresponding digital sample streams $s1(n)$ to $sN(n)$, where n is the sample number. Of course, the force sensors S1 to SN may output respective digital sample streams $s1(n)$ to $sN(n)$ directly. Equally, classification may be performed based on the analogue signals in some arrangements, however classification based on the digital sample streams will be carried forwards as an example.

At this juncture, it is noted that force sensors 130 as deployed in modern host devices produce signals that have a slowly varying baseline level that is modulated by physical events (e.g. changes in ambient temperature or pressure). A baseline level may be taken to mean a level (e.g. bias level) at which a corresponding raw sensor signal is taken to indicate a zero magnitude or zero input. In the case of a force sensor, a baseline level may be taken to mean a level at which a corresponding raw sensor signal is taken to indicate zero applied force. A baseline signal may be taken to mean a signal which indicates baseline level. Ultimately, force information may be determined from a given raw sensor signal based on a difference between that raw sensor signal and its corresponding baseline signal.

Typically, the signals subject to analogue-to-digital conversion, ADC, are the raw sensor signals, i.e. before the baseline signals are subtracted therefrom. However, baseline subtraction could equally be applied prior to analogue-to-digital conversion. For simplicity, the baseline subtraction is not shown in FIG. 4.

It will be assumed, again for simplicity, that the sensor signals considered hereinafter (whether they are pre or post analogue-to-digital conversion) are sensor signals whose values are relative to their baseline levels, i.e. which indicate a difference between a raw sensor signal and its corresponding baseline signal.

Assuming the sample streams are synchronised for convenience, the force sensors S1 to SN may be considered to provide a stream of sensor samples SS(n), as indicated in FIG. 4, which each include a sample value from each of the N sensors. Each such sensor sample SS(n) may thus be represented in vector (or matrix) form as:

$$SS(n) = \begin{bmatrix} s1(n) \\ s2(n) \\ s3(n) \\ \vdots \\ sN(n) \end{bmatrix}$$

Taking N=2 and N=3 as examples, it can be understood that each sensor sample may be considered to define a sample vector SV(n) in N-dimensional vector space, where the dimensions are D1 to DN, as indicated in FIG. 5. Each sample vector SV(n) may then be taken to define a location in the vector space, as also indicated. Of course, although only up to three dimensions are shown in FIG. 5, it will be appreciated that for N≥4 higher dimensions of vector space may be considered.

With the above in mind, FIG. 6 is a schematic diagram of a classification system 180, which may also be referred to itself as a classifier. The classification system 180 comprises a classifier 200, a determiner 300 and a controller 400, which together may be referred to as a classifier 500.

The classifier 200 or 500, the determiner 300 and/or the controller 400 may be implemented in the host device 100, for example as, or as part of, the controller 110. In one arrangement the classifier 200 or 500, the determiner 300 and/or the controller 400 may be implemented as program code running on the controller 110.

The classifier 200 is shown as receiving digital sample streams $s1(n)$ to sN(n), from corresponding force sensors S1 to SN. In the general case, N≥1 as above. The classifier 200 is shown as outputting a stream of classification results CR(n).

The classifier 200 is for classifying sensor samples SS(n) in a sensor system, the sensor system comprising N force sensors S1 to SN each configured to output a sensor signal, where N≥1. The host device 100 having the force sensors 130 is an example of such sensor system. Each sensor sample SS(n) comprises N sample values $s1(n)$ to sN(n) from the N sensor signals, respectively, defining a sample vector SV(n) in N-dimensional vector space.

The classifier 200 is configured, for each of a series of candidate sensor samples SS(n), to perform a classification operation based on the N sample values concerned and generate a classification result which labels the candidate sensor sample as indicative of a defined target event, thereby generating the series of classification results corresponding to the series of candidate sensor samples, respectively. Put more simply, the classifier 200 is configured to classify a stream of sensor samples SS(n) one by one, and to output a corresponding stream of classification results CR(n).

The determiner 300 is configured to receive the stream of classification results CR(n), corresponding to the stream of sensor samples SS(n), and to output a corresponding stream of event determinations E(n), or at least one determination E(n). The controller 400 is configured to control the classifier 200 and/or the determiner 300 based on one or more controller input signals.

Focus will now be placed on the classifier 200. The determiner 300 and controller 400 will be considered in more detail later.

It is assumed that the classifier 200 has access to a target definition corresponding to at least one target event. For example, a target event may correspond to a press of a virtual button. The classifier 200 may have access to multiple target definitions corresponding to multiple target events. For example, the target events may correspond to presses of respective virtual buttons, and may include target events which correspond to "anomalous input" states (e.g. twisting/bending of the host device 100). Although classifier 200 may consider non-pressed states of virtual buttons or even "possibly pressed" states itself, such states will be considered later in connection with the determiner 300.

An example target definition may define a bounded target region of X-dimensional vector space, where $X \leq N$ (to allow for dimension reduction). Here, the target event may correspond to a button press of a virtual button defined relative to the force sensors S1 to SN. A bounded region may be a region which has a defined boundary, i.e. a continuous boundary. A bounded region may be enclosed on all sides, in the vector space.

Taking a candidate sensor sample SS(n) as an example, the classifier 200 may be configured, for the candidate sensor sample, to perform a classification operation comprising determining a candidate location in the X-dimensional vector space defined by a candidate vector corresponding to the candidate sensor sample, the candidate vector CV(n) being the sample vector SV(n) for the candidate sensor sample or a vector derived therefrom. The classification operation may further comprise generating a classification result CR(n) for the candidate sensor sample SS(n) based on the candidate location. The classification result would then label the candidate sensor sample SS(n) as indicative of the target event if the candidate location is within the target region.

In this way, taking each sensor sample SS(n) of a stream of sensor samples SS(n) in turn as a candidate sensor sample, a stream of classification results CR(n) corresponding to the stream of sensor samples SS(n) may be generated.

Looking at FIG. 5 for example, the target region could be understood to be a two-dimensional region where $X=2$ (recall that $X \leq N$) and a three-dimensional region where $X=3$. Of course, the classifier may have access to a plurality of target definitions corresponding to a plurality of target events, respectively, the target definitions each defining a corresponding bounded target region of the vector space. Here, the target events may correspond to button presses of corresponding virtual buttons defined relative to the force sensors S1 to SN.

It is emphasised that the above example, considering bounded target regions of vector space, is merely an example, and that the classification system 180 may be "agnostic" to the type of classifier 200. The classifier 200 may for example be a rule-based, SVM (support-vector machine), decision tree, or DNN (deep neural network) classifier, and these are just examples. To take a relatively simple example implementation as a running example, reference is made to FIG. 7.

FIG. 7 is an example definition of a rule-based classifier 200, operating where there are two force sensors 130, S1 and S2, i.e. where $N=2$. The sensor signals s1(n) and s2(n) are indicated here as analogue signals $y_{coil\_1}(t)$ and $y_{coil\_2}(t)$, respectively, and could of course be represented by corresponding digital signals.

For the present example, the classifier 200 monitors a normalized difference feature (or metric), as in the upper part of FIG. 7, and maps this feature to different physical locations on the physical button (see FIG. 3) as indicated in the table in the lower part of FIG. 7. To emphasise that the number N of sensors 130 may be less than the number of virtual buttons (or positions), in this example it is assumed that the two force sensors S1 and S2 are used to monitor five virtual buttons, namely 'top external', 'top', 'center', 'bottom' and 'bottom external', positioned in that order from top to bottom in line with FIG. 3. The virtual buttons 'top external' and 'bottom external' are not shown in FIG. 3 but may be considered to correspond to the uppermost and lowermost extreme regions of the physical button, respectively.

Upper and lower threshold values are then set for each of the virtual buttons, as indicated in the table of FIG. 7. Once these threshold values are set the classifier 200 may be considered configured. For example, for the 'top' (virtual) button, the upper threshold value is indicated as $\text{Difference\_Threshold}_{Top\_Button\_Upper}$ and the lower threshold value is indicated as $\text{Difference\_Threshold}_{Top\_Button\_Lower}$. By setting the threshold values appropriately, and by assessing the normalized difference feature against those thresholds, the location of an applied force can be associated with a location/region on the physical button corresponding to one of the virtual buttons.

This configuration by setting the threshold values may be considered a calibration process and once these threshold values are set the classifier 200 may be considered calibrated. Of course, such a classifier may be implemented using machine learning (ML), and the equivalent configuration process may then be considered a training process with the classifier once configured being considered trained.

The normalized difference feature shown in FIG. 7 is naturally just an example. Other examples include replacing the "max" (maximum of) function with a "mean" (mean average of) or "rms" (root-mean-square of) function.

Returning to FIG. 6, it is recalled that the determiner 300 is configured to receive the stream of classification results CR(n), corresponding to the stream of sensor samples SS(n), and to output a corresponding stream of event determinations E(n), or at least one determination E(n). The controller 400 is configured to control the classifier 200 and/or the determiner 300 based on one or more controller input signals.

The determiner 300 may be understood to take "internal" classifications of the classification system 180, i.e. the classification results CR(n), and generate "external-facing" classifications of the classification system 180, i.e. the event determinations E(n), based on those internal classifications (and, in some arrangements, control by the controller 400).

For example, the determiner 300 may generate a series of event determinations E(n) corresponding to the series of classification results CR(n), respectively, i.e. an event determination E(n) per classification result CR(n). However, the determiner 300 may be configured to determine each event determination E(n) based on a corresponding plurality of consecutive classification results CR(n). In this way, each event determination E(n) may be based on more than one classification result CR(n), and for example allow for an averaging effect or low-pass-filtering effect.

The determiner 300 may for example be employed to implement a "debouncing" mechanism in respect of the one or more virtual buttons, for example looking at a history of classification results CR(n) rather than single classification results CR(n), to reduce the chance of a signal press appearing as multiple presses, or a transient in the sensor signals appearing as a press. Such control may lead to improved system stability and robustness against errors/noise.

As indicated in FIG. 6, the controller 400 may receive many input signals, referred to herein as controller input signals (or, more simply, controller signals). The controller 400 however need not receive all of the controller input signals as indicated in FIG. 6 in all arrangements, and thus may in general be considered to receive at least one of them.

Each controller input signal may be taken to comprise, or be derived from, one or more of: the series of classification results CR(n), a current classification result CR(n) and/or a preceding classification result CR(n); the at least one event determination E(n), the series of event determinations E(n), a current event determination E(n) and/or a preceding event determination E(n); the N sensor signals $s1(n)$ to $sN(n)$, or at least one of the N sensor signals; at least one sensor signal obtained from another sensor of the sensor system (not shown) such as a temperature sensor, accelerometer, microphone or camera; a control signal of the classification system; and a feedback signal input by a user in response to the N sensor signals $s1(n)$ to $sN(n)$, the classification results CR(n) and/or the at least one event determination E(n). The controller 400 is shown in FIG. 6 as receiving an external control signal ECS, and this may be considered to represent any or all of the at least one sensor signal obtained from another sensor of the sensor system (for example of the I/O unit 140) and the feedback signal input by the user.

Where a controller input signal comprises or is derived from more than one of the above signals, the reference signal may be generated based on a (e.g. mathematical) combination of those signals, or may be considered to comprise sub-signals corresponding respectively to those signals.

A "controller input signal" may be taken to be a signal generated within the controller 400 based on one or more of the signals it receives. For example, the controller 400 may be equipped to derive one or more controller input signals based on signals it receives. The controller 400 may derive a controller input signal by applying a delay to a signal it receives. As another example, a controller input signal may comprise a time-domain and/or frequency-domain feature extracted from a sensor signal, control signal or feedback signal, or a combination thereof. An extracted feature may for example comprise a magnitude or a rate of change.

The controller 400, based on its one or more controller input signals, may thus be configured to control the classifier 200 and/or the determiner 300 to ultimately affect the event determinations E(n). For example, the control may take the form of feedback control (e.g. based on the feedback signal input by the user) or feedforward control (e.g. based on the sensor signals themselves).

As will be explained later, one form of feedforward control may involve controlling the classifier 200 and/or the determiner 300 to adapt their operation to a given responsiveness (or sensitivity) of the force sensors 130 to an applied force, or to a change in the responsiveness of the force sensors 130 to an applied force with changing magnitude of the applied force.

In some arrangements, the determiner 300 may comprise, or be implemented as, a state machine such as a finite state machine or a deterministic finite state machine. In such a case, the event determinations E(n) may indicate the current state of the state machine, with the different states thus corresponding to different values of the event determinations E(n).

The state machine may be configured to transition between defined states, based on the controller input signals (i.e. based on at least one of the controller input signals, including the classification results CR(n)).

The state machine may define permitted transitions between its states, and, for each permitted transition between its states, at least one transition criterion which if satisfied will trigger that transition of state. The controller 400 may be considered a transition criteria extraction unit, and may be configured to extract features from the controller input signals which are then used by the state machine to determine whether to change state. Each transition criterion may be defined by one or more of the controller input signals.

Inputs to the state machine from the controller 400 may thus comprise features, including time and frequency domain, or associated classifier outputs based on these features, extracted from the sensor signals. Inputs to the state machine from the controller 400 may similarly comprise features, including time and frequency domain, or associated classifier outputs based on these features, extracted from other sensors in the system, such as (not shown) a temperature sensor, accelerometer, microphone or camera (for example of the I/O unit 140). Inputs to the state machine from the controller 400 may similarly comprise feedback gathered from a human user, who is interacting with the host device 100 (such as a mobile phone or tablet), through a GUI, voice interface or other feedback mechanism (for example, see the external control signal ECS of FIG. 6).

As a simple example, corresponding to the classifier implementation of FIG. 7, the controller 400 may be configured to detect whether a virtual button has been pressed by virtue of the following control function:

IF
$(y_{coil\_1}(t) >$ Force_Threshold$_{coil\_1})$ OR $(y_{coil\_2}(t) >$ Force_Threshold$_{coil\_2})$ THEN virtual button has been pressed A more complex implementation of the controller 400 might take the form of another classifier which takes as an input $y_{coil\_1}(t)$ and $y_{coil\_2}(t)$ and outputs a classification result which indicates whether a button has been pressed (rather than if an applied force is applied in the location of a virtual button, as in the example implementation of classifier 200 described earlier). Such an implementation may effectively determine a weighted average of the inputs $y_{coil\_1}(t)$ and $y_{coil\_2}(t)$.

Such implementations of the controller 400 may thus provide the state machine of the determiner 300 with an input signal indicating whether an applied force has been determined to indicate a button press, with the state machine of the determiner 300 also receiving the classification results CR(n) to indicate whether the location of the applied force corresponds to that of a given virtual button.

In this way, the state machine may prevent button bouncing when operating with noisy force sensor signals, and can be configured to facilitate operation with non-linear force sensors (as mentioned later herein). Effectively, the state machine may control the allowed transitions of the final "external" state (i.e. the event determinations E(n)) based on any of: transition-criteria signals from the controller 400 (e.g. an input signal indicating whether an applied force has been determined to indicate a button press, as above); the current and/or prior event determination E(n); and the current and/or prior classification result CR(n). The state machine may be implemented as a rule-based system which takes such input signals and outputs the event determinations E(n) as the final of external-facing system states.

Figure 8:
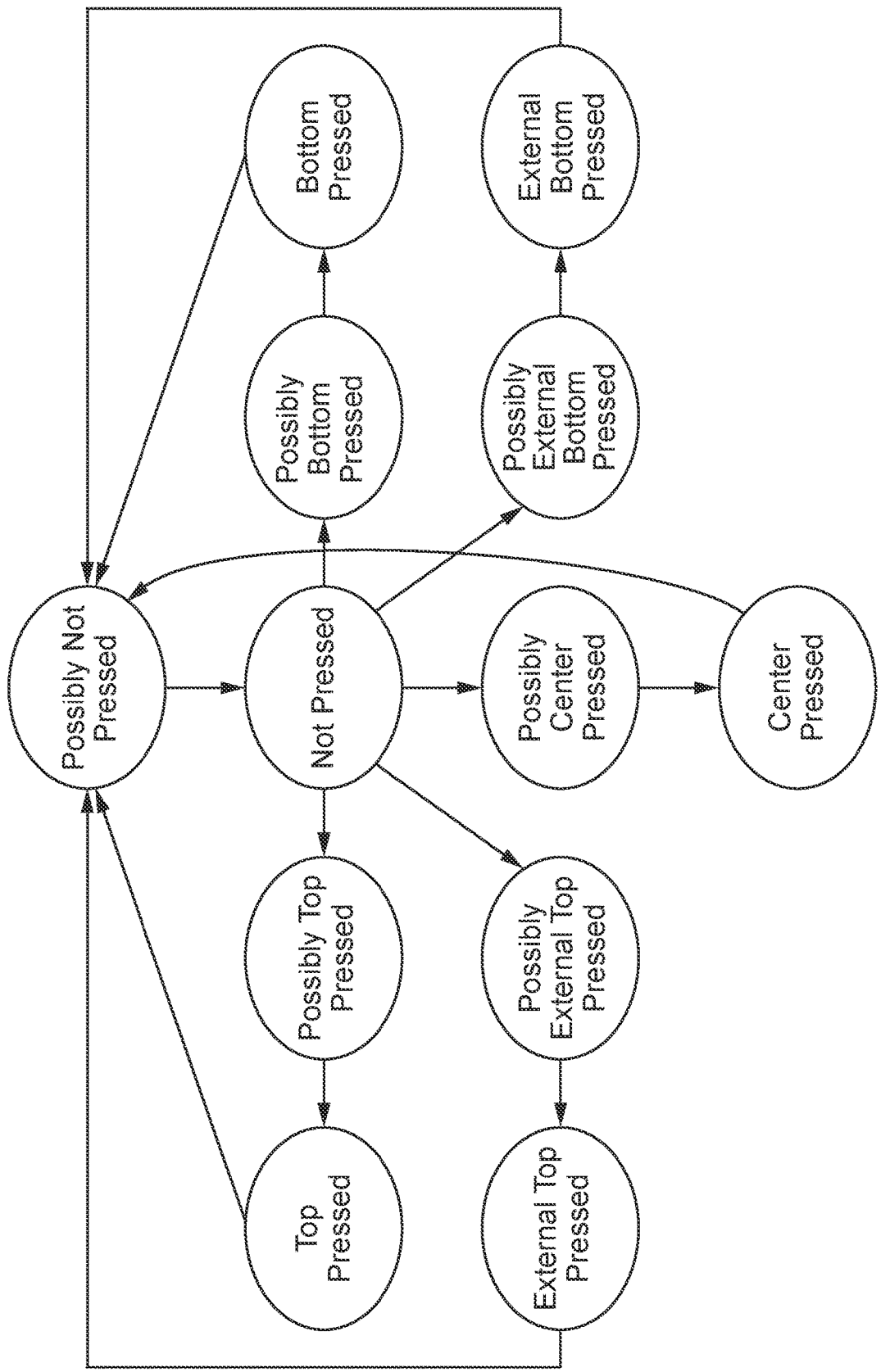
FIG. 8 is a schematic diagram of an example state diagram of a state machine.

FIG. 8 is a schematic diagram of an example state diagram of a state machine as may be implemented by the determiner 300. The state diagram takes the form of a directed graph, whose nodes correspond to defined states and whose edges correspond to defined or allowed transitions between those states. For convenience, the states correspond to the example of FIG. 7, with each virtual button having a "possibly pressed" state and a "pressed" state, and with there being common "possibly not pressed" and "not pressed" states. Of course, the state diagram shown is just an example.

The state machine may be configured to change state from a "not pressed" state to a "pressed" state for a given virtual button if the classification results CR(n) indicate the location of that applied force to correspond to that virtual button, and if the controller 400 has detected the presence of a button press (e.g. button press=ON) for a threshold number (e.g. an integer R) of previous samples. Thus, it may be a requirement that the classification results CR(n) have indicated a constant target event (i.e. corresponding to a force applied at a given location) for that threshold number of previous samples.

Put another way, the state machine may be defined such that the determiner 300 outputs an event determination E(n) which indicates that a given target event has been determined to have occurred if at least a threshold number of the classification results CR(n) label their candidate sensor samples SS(n) as indicative of that given target event, and/or if the sensor samples SS(n) for at least a threshold number of those classification results CR(n) indicate that an applied force meets a defined criterion. Additionally, or alternatively, a transition between states of the state machine corresponding to a transition from a preceding event determination E(n) to the event determination E(n) (which indicates that the given target event has been determined to have occurred) needs to be a permitted transition between the states of the state machine.

It may be a requirement that the threshold number of classification results CR(n) which label their candidate sensor samples as indicative of the given target event are consecutive classification results CR(n) in the series of classification results CR(n). The defined criterion may include that the applied force exceeds a defined threshold level.

The transition to a new final state, i.e. a new value of event determination E(n), may be allowed based on a new target event indicated by the new classification result CR(n) and the previous event determination E(n) value.

For any given application, the defined states and allowed transitions may be designed according to the desired human computer interface experience. For example, the state diagram of FIG. 8 only allows the user to transition from the "top pressed" to the "bottom pressed" state if they go through the "Not Pressed" state, i.e. by releasing the button, and this may not always be desirable. Other implementations of the state machine may allow for "slider" functionality for example, i.e. the user swiping across the virtual buttons. By limiting the possible transitions between states, the probability of noise causing the virtual buttons to bounce between states is reduced.

In some implementations, the state machine may be configured to implement hysteresis control in switching between states. As one example, the classifier 200 may be configured to generate a confidence metric for each classification result CR(n), and the controller input signals may comprise the confidence metrics, the confidence metric for the current classification result CR(n) and/or the confidence metric for a preceding classification result CR(n). Each confidence metric may indicate a degree of confidence in its classification result CR(n) and be provided along with, or even as part of, the classification results CR(n). In such a case, the state machine may be configured to require, for transitioning from a first state to a second state, a greater degree of confidence in relation to the second state to transition to the second state than in relation to the first state to remain in the first state. The state machine may be configured to implement hysteresis control in switching between states based on the series of classification results CR(n) and/or their confidence metrics.

As mentioned earlier, in connection with the controller 400, one form of feedforward control may involve controlling the classifier 200 and/or the determiner 300 to adapt their operation to a given responsiveness (or sensitivity) of the force sensors 130 to an applied force, or to a change in the responsiveness of the force sensors 130 to an applied force with changing magnitude of the applied force.

Figure 9:
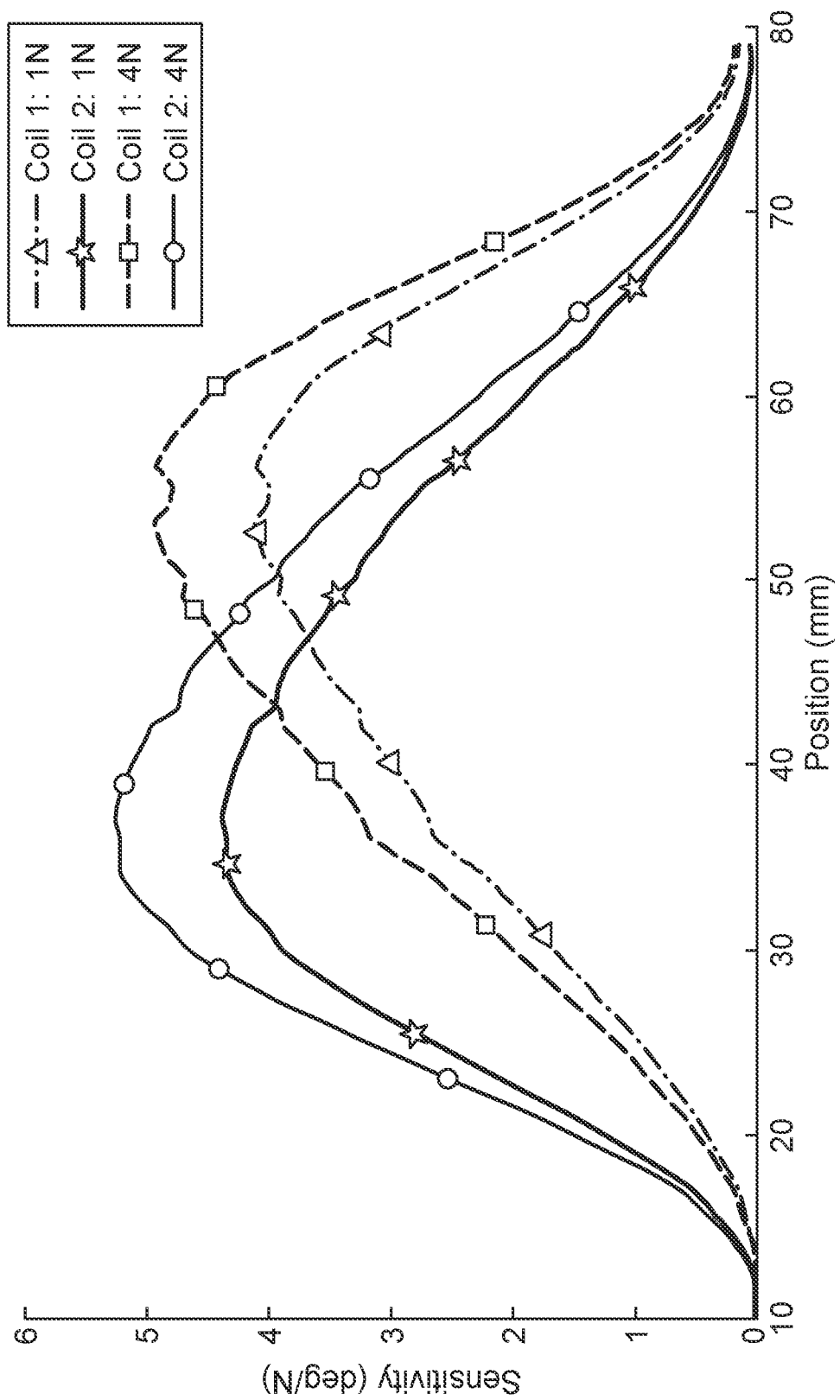
FIG. 9 is a graph showing force sensor sensitivity.

The force sensors 130 may be non-linear sensors, in that their sensitivity may be (non-linearly) dependent on the force applied. Thus, the mapping from sensor signals $s1(n)$ to $sN(n)$ to discrete press locations may depend on the force applied, which may lead to problems in classification. FIG. 9 is a graph showing force sensor sensitivity (in deg/N, e.g. assuming inductive force sensors 130) as a function of position (in mm) of the applied (constant) force along the physical button (see e.g. FIG. 3), for two sensors (identified as Coil 1 and Coil 2) located at different positions, and for two different applied forces, namely 1 N and 4 N. Of course, the units deg/N for sensitivity in FIG. 9 relate to an example where the sensor output is measured in degrees (e.g. of phase shift between I and Q signals). In general, the sensitivity could be expressed as arbitrary units/N where the sensor output is expressed in those arbitrary units.

If the force sensors 130 were linear sensors, it could be expected that for a given sensor (e.g. Coil 1) the graphs for 1 N and 4 N would be the same as one another. For example, it might be expected in that case that the sensor output doubles when the force applied doubles—with the sensitivity being the same. However, it is shown in FIG. 9 that the sensitivity changes with the magnitude of the applied force.

Given such non-linear behaviour, the classifier 200 may be configured for operation at a given force value (configuration value), so that the classifier 200 most accurately produces classification results CR(n) when the applied force is at or close to that given force value. However, when the applied force is substantially different from the given force value (configuration value), the accuracy in the classification results CR(n) may decrease, or the error in those classification results CR(n) may increase.

As earlier, references to the classifier 200 being "configured" for operation at a given force value ("configuration" value), may be taken, in some arrangements, as the classifier 200 being "calibrated" for operation at a given force value ("calibration" value), and, in other (machine learning) arrangements, as the classifier 200 being "trained" for operation at a given force value ("training" value). References herein to the classifier being configured" for operation at a given force value (configuration value) will thus be considered accordingly.

Figure 10:
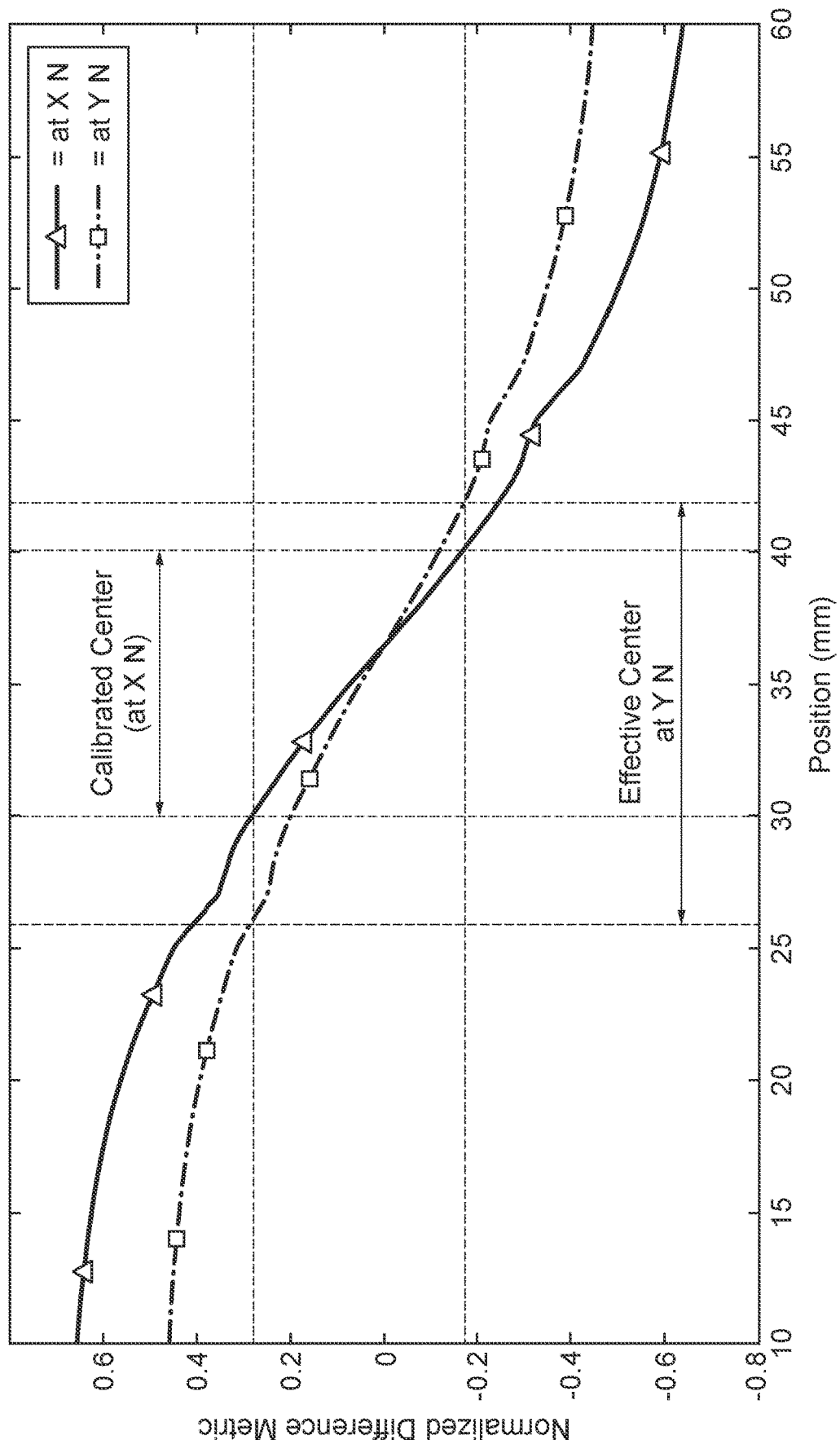
FIG. 10 is a graph showing a plot of a normalized difference metric.

As an example, FIG. 10 is a graph showing a plot of the normalized difference metric or feature of FIG. 7 as a function of position (in mm) along the physical button (see e.g. FIG. 3), for two different applied forces, namely X N and Y N. In this example, the classifier 200 is configured (e.g. calibrated) for use with an applied force of X N, to determine that the applied force is applied at positions from 30 mm to 40 mm corresponding to the center virtual button (see FIG. 3), as indicated, when the (unitless) normalized difference metric resolves to −0.18 to +0.28. As also indicated, however, when the applied force is changed from X N to Y N, the −0.18 to +0.28 normalized difference metric now corresponds to positions from 26 mm to 42 mm. Thus, the classifier 200 (configured for use at X N) may determine that the applied force at Y N is applied at a position corresponding to the center virtual button (see FIG. 3) when it is applied at positions from 26 mm to 42 mm (introducing errors as compared to 30 mm to 40 mm).

One solution to this problem is for the determiner 300 (e.g. its finite state machine) to only allow changes in value of the event determinations E(n) (corresponding to state transitions) to occur when the force applied passes over a narrow force range (for which operation of the classifier 200 is configured, e.g. calibrated). The example state diagram of FIG. 8 for example always passes through a "No Press" state before entering an actual virtual button "press state". This is because during the rising edge of the button press signal, it will naturally cross over the narrow force range where a state transition is allowed. In this way, the classifier 200 and/or determiner 300 may be able to handle the problem of force sensor non-linearities.

For example, the classifier 200 may be configured for operation at at least one configuration value of a reference signal, the reference signal comprising or derived from at least one controller input signal.

The reference signal may thus be taken to comprise, or be derived from, one or more of: the series of classification results CR(n), a current classification result CR(n) and/or a preceding classification result CR(n); the at least one event determination E(n), the series of event determinations E(n), a current event determination E(n) and/or a preceding event determination E(n); the N sensor signals s1($n$) to sN(n), or at least one of the N sensor signals; at least one sensor signal obtained from another sensor of the sensor system (not shown) such as a temperature sensor, accelerometer, microphone or camera; a control signal of the classification system; and a feedback signal input by a user in response to the N sensor signals s1($n$) to sN(n), the classification results CR(n) and/or the at least one event determination E(n). Recall that the external control signal ECS shown in FIG. 6 may be considered to represent any or all of the at least one sensor signal obtained from another sensor of the sensor system (for example of the I/O unit 140) and the feedback signal input by the user.

Where the reference signal comprises or is derived from more than one of the above signals, the reference signal may be generated based on a (e.g. mathematical) combination of those signals, or may be considered to comprise sub-signals corresponding respectively to those signals.

For example, the reference signal could comprise or be derived from a single sensor signal, a fusion of multiple sensor signals, a signal from (or generated within) the controller 400 derived from a sensor signal, and/or a signal from another (e.g. external) sensor. Example combinations/fusions include selecting and averaging operations, such as MAX and MEAN functions, e.g. MAX(sensor_1(t), sensor_2(t) . . . ) and MEAN(sensor_1(t), sensor_2(t)). The reference signal may comprise a sub-signal per force sensor.

The controller 400 may be configured, based on a current value of the reference signal, to control the classifier 200 and/or the determiner 300 to cause the determiner 300 to output the at least one event determination based selectively or only on classification results generated when the current value of the reference signal is substantially at, or within a configuration (e.g. calibration or training) range of, the configuration (e.g. calibration or training) value in respect of which the classifier is operating. The configuration range may be narrow, for example spanning ±1% or ±5% or ±10% or ±20 of the configuration value.

Thus, considering the state machine implementations described earlier, the defined states may comprise a pressed state, representative of a press of a virtual button defined in relation to the N force sensors. A permitted transition into the pressed state may define as transition criteria that: the controller input signals indicate that a magnitude of an applied force in a location corresponding to the virtual button transitions from below a non-press threshold to above a press threshold, and that the classification results indicate that the applied force is at the location corresponding to the virtual button when the controller input signals indicate that the magnitude of the applied force in that location is substantially at, or within a configuration (e.g. calibration or training) range of, a configuration (e.g. calibration or training) force for which the classifier operation has been configured. The configuration range may be between the non-press threshold and the press threshold. Again, the configuration range may be narrow, for example spanning ±1% or ±5% or ±10% or ±20 of the configuration force.

Another approach is to adjust operation of the classifier 200 and/or the determiner 300 based on a reference signal (indicative of a factor affecting sensitivity of the N force sensors and/or of an applied force detected by the N force sensors), so as to operate differently for different values of the reference signal rather than being selective regarding which classification results are employed.

For example, looking at FIG. 6, the classifier 200 may be configured (calibrated or trained) for operation at at least one configuration value of a reference signal, the reference signal comprising or derived from at least one controller input signal. The controller 400 may be configured, based on a current value of the reference signal, and optionally based on stored sensor characterisation data or a stored characterisation function or model derived from sensor characterisation data, to control the classifier 200 and/or the determiner 300 (in the sense of how their outputs depend on their inputs) to reduce a difference, being a configuration-related difference, between: the classification results CR(n) and/or the at least one event determination E(n); and corresponding classification results CR(n) and/or a corresponding at least one event determination E(n) expected when the reference signal has the configuration value in respect of which the classifier is operating. As above, the reference signal may be indicative of a factor affecting sensitivity of the N force sensors and/or of an applied force detected by the N force sensors. For example, the reference signal may be derived from the sensor signals s1($n$) to sN(n).

In this respect, the controller 400 may be configured to control the classifier 200 and/or the determiner 300 to reduce the configuration-related difference based on a difference, being a reference-related difference, between the current value of the reference signal and the configuration value in respect of which the classifier is operating. The controller 400 may be configured to control the classifier 200 and/or the determiner 300 to reduce the configuration-related difference based on a control function and the reference signal, the control function being a function of the reference signal and optionally based on stored sensor characterisation data or a stored characterisation function or model derived from sensor characterisation data.

Figure 11:
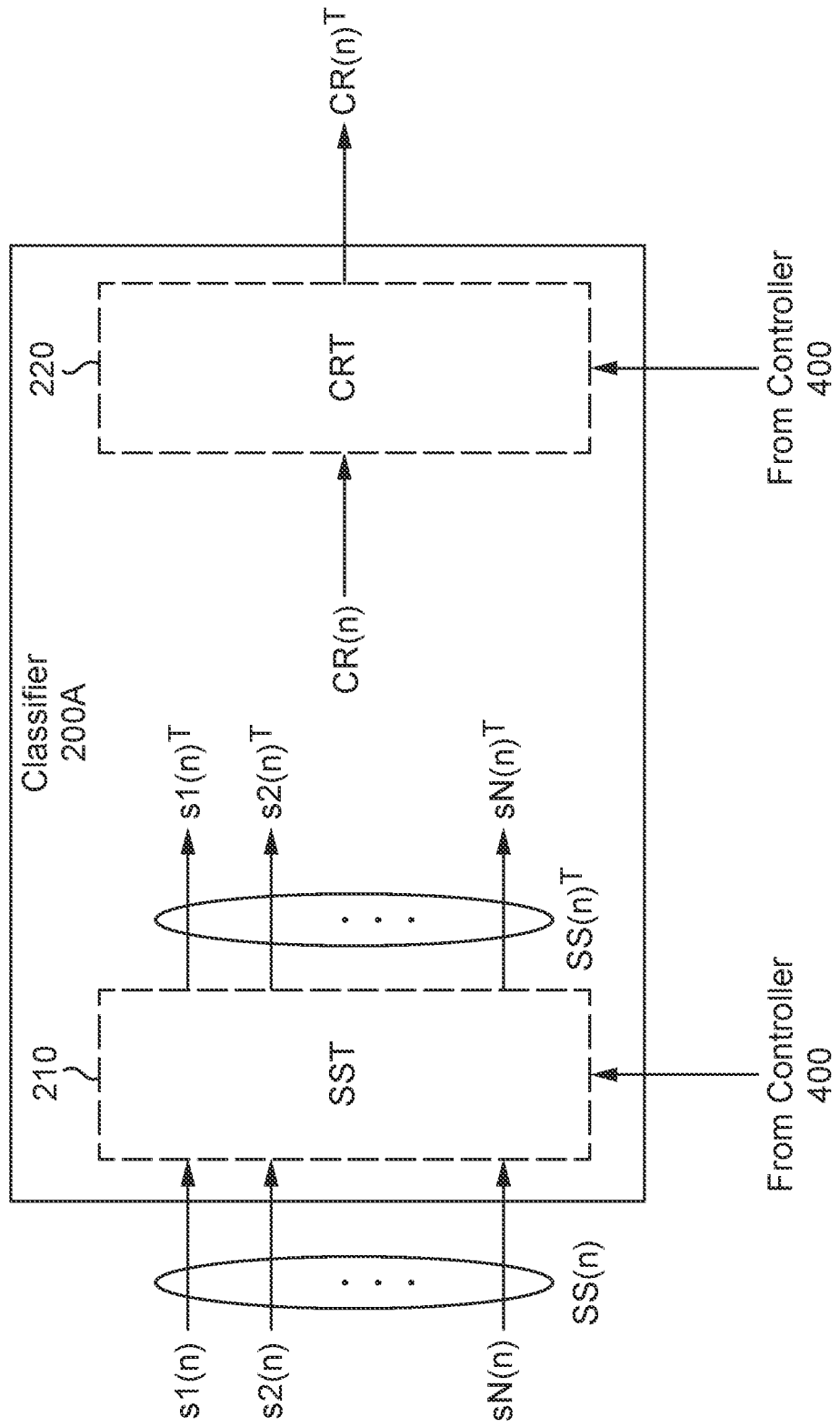
FIG. 11 is a schematic diagram of a classifier, being an implementation of the classifier of FIG. 6.

FIG. 11 is a schematic diagram of a classifier 200A, being an implementation of the classifier 200. The classifier 200A may therefore be employed in place of the classifier 200. The classifier 200A is shown as comprising a sensor sample transformer (SST) 210 and a classification result transformer (CRT) 220. However, the classifier 200A may comprise either one or both of the SST 210 and the CRT 220.

Taking the SST 210 first, the sensor samples SS(n) considered above may be considered untransformed sensor samples. In this respect, the sensor signals s1(n) to sN(n) may similarly be considered untransformed sensor signals. As indicated in FIG. 11, the SST 210 is configured to generate transformed sensor samples $SS(n)^T$ by transforming the untransformed sensor samples SS(n), with the transformed sensor samples $SS(n)^T$ thus comprising transformed sensor signals $s1(n)^T$ to $sN(n)^T$.

Where the SST 210 is provided, the classifier 200A is configured, for each of the series of candidate sensor samples SS(n), to perform the classification operation based on the corresponding transformed sensor sample $SS(n)^T$. Further, the controller 400 is configured to control the SST 210 based on the reference signal to reduce the configuration-related difference. When the reference signal is indicative of a factor affecting sensitivity of the N force sensors and/or of an applied force detected by the N force sensors, as mentioned earlier, this may enable the SST 210 to effectively "predistort" the sensor samples SS(n) so that the transformed sensor samples $SS(n)^T$ compensate for non-linear operation of the N force sensors 130.

For example, the SST 210 may be configured to transform the untransformed sensor samples SS(n) into the transformed sensor samples $SS(n)^T$ based on a sensor-sample transform function and the reference signal, the sensor-sample transform function being a function of the reference signal.

It will be understood that the transform functions considered herein may operate on a per sensor signal basis as may be appropriate. For example, in general, a transformed signal corresponding to a given sensor number 1, transformed_signal_1(t), may be determined as:

untransformed_signal_1(t)−non_linear_correct_model (untransformed_signal_1(t))

Looking back at FIG. 9, the sensor-sample transform function may be configured based on sensor characterisation data (or a stored characterisation function or model derived from sensor characterisation data) to enable a transform from the untransformed sensor samples SS(n) to the transformed sensor samples $SS(n)^T$ based on the reference signal.

The sensor characterisation data may for example define or describe the non-linear operation of the N force sensors 130, e.g. define how their input-output transfer function (applied force to sensor signal) is dependent on the applied force. Such data may define or describe the N force sensors 130 individually, where N≥1, and the transform function may operate on the individual sensor signals differently. Similar considerations may apply to the other transform functions described herein.

Thus, the sensor-sample transform function may be configured, optionally based on stored sensor characterisation data or a stored characterisation function or model derived from sensor characterisation data (accessible by the SST 210), to transform the untransformed sensor samples SS(n) into the transformed sensor samples $SS(n)^T$ to reduce the configuration-related difference and/or a difference, being a sensor-related difference, between the transformed sensor signals $SS(n)^T$ and corresponding untransformed sensor samples SS(n) expected when the reference signal has the configuration value in respect of which the classifier is operating.

Taking the CRT 220 second, the classification results CR(n) considered above may be considered untransformed classification results. As indicated in FIG. 11, the CRT 220 is configured to generate transformed classification results $CR(n)^T$ by transforming the untransformed classification results CR(n).

Where the CRT 220 is provided, the determiner 300 is configured to output its at least one event determination E(n) based on the series of transformed classification results $CR(n)^T$. Further, the controller 400 is configured to control the CRT 220 based on the reference signal to reduce the configuration-related difference. As before, when the reference signal is indicative of a factor affecting sensitivity of the N force sensors and/or of an applied force detected by the N force sensors, this may enable the CRT 220 to effectively "correct" the classification results CR(n) so that the transformed classification results $CR(n)^T$ compensate for non-linear operation of the N force sensors 130. The notion of correction herein may encompass at least partial correction—i.e. "correct" may be read as "at least partially correct".

For example, the CRT 220 may be configured to transform the untransformed classification results CR(n) into the transformed classification results $CR(n)^T$ based on a classification-result transform function and the reference signal, the classification-result transform function being a function of the reference signal. Looking back at FIGS. 9 and 10 for example, the classification-result transform function may be configured based on sensor characterisation data (or a stored characterisation function or model derived from sensor characterisation data) to enable a transform from the untransformed classification results CR(n) to the transformed classification results $CR(n)^T$ based on the reference signal.

The sensor characterisation data may for example define or describe the non-linear operation of the N force sensors 130 as mentioned earlier. The classification-result transform function may also define or describe the intended operation of the classifier, or the dependence of the classification results CR(n) on the non-linear operation of the N force sensors 130.

Thus, the CRT 220 may be configured, optionally based on stored sensor characterisation data or a stored characterisation function or model derived from sensor characterisation data (accessible by the CRT 220), to transform the untransformed classification results CR(n) into the transformed classification results $CR(n)^T$ to reduce the configuration-related difference and/or a difference between the transformed classification results $CR(n)^T$ and corresponding untransformed classification results CR(n) expected when the reference signal has the configuration value in respect of which the classifier is operating.

Figure 12:
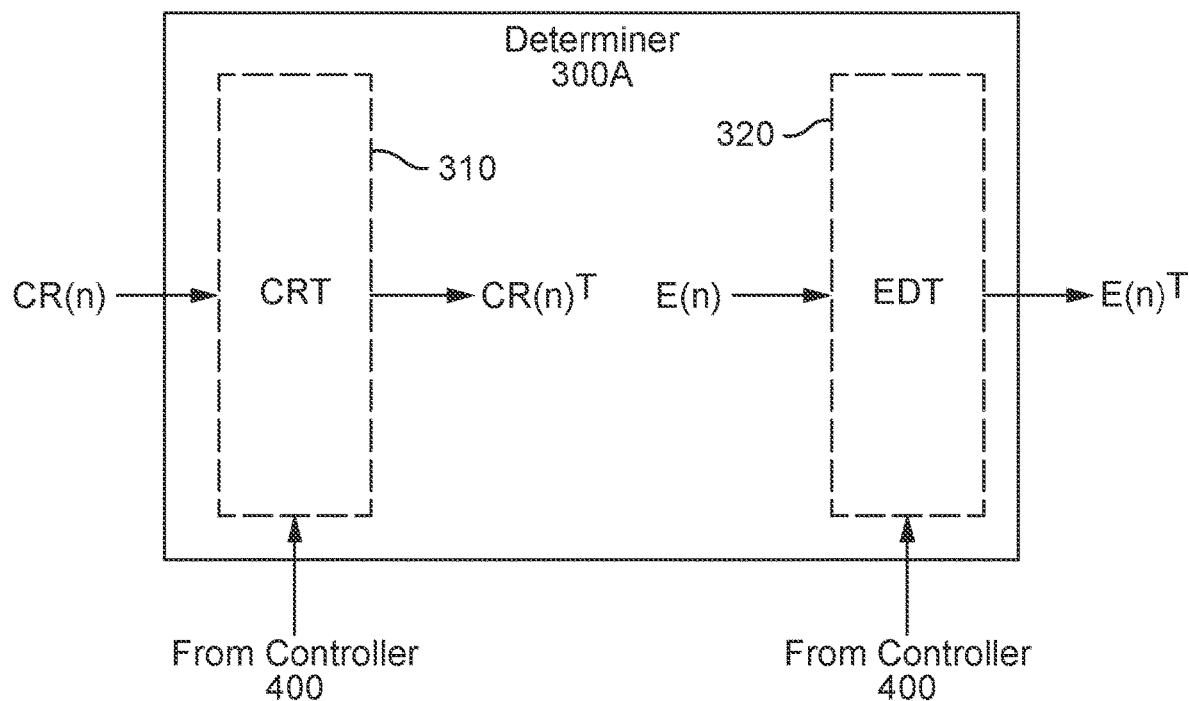
FIG. 12 is a schematic diagram of a determiner, being an implementation of the determiner of FIG. 6.

FIG. 12 is a schematic diagram of a determiner 300A, being an implementation of the determiner 300. The determiner 300A may therefore be employed in place of the determiner 300. The determiner 300A is shown as comprising a classification result transformer (CRT) 310 and an event determination transformer (EDT) 320. However, the determiner 300A may comprise either one or both of the CRT 310 and EDT 320.

The CRT 310 may be considered to have the same functionality as that of the CRT 220 as described earlier, or the combination of the CRT 310 and the CRT 220 may be considered to have the same functionality as that of the CRT 220 as described earlier. Thus, it may be that the determiner 300A has the CRT 310 the classifier 200A does not have the CRT 220, or vice versa. Alternatively, the combination of the CRT 310 and the CRT 220 may together provide the functionality as described in respect of the CRT 220 in relation to FIG. 11.

Where the determiner 300A has the CRT 310 (and the classifier 200A does not have the CRT 220), the CRT 310 is configured to generate transformed classification results $CR(n)^T$ as indicated in FIG. 12 by transforming the untransformed classification results $CR(n)$. The determiner 300A is then configured to output its at least one event determination $E(n)$ based on the series of transformed classification results $CR(n)^T$. Further, the controller 400 is configured to control the CRT 310 based on the reference signal to reduce the configuration-related difference, as described before in respect of the CRT 220 (so that duplicate description may be omitted).

Turning to the EDT 320, the at least one event determination $E(n)$ considered above may be considered an untransformed event determination. As indicated in FIG. 12, the EDT 320 is configured to generate at least one transformed event determination $E(n)^T$ by transforming the at least one untransformed event determination $E(n)$.

Where the EDT 320 is provided, the controller 400 is configured to control the EDT 320 based on the reference signal to reduce the configuration-related difference. As before, when the reference signal is indicative of a factor affecting sensitivity of the N force sensors and/or of an applied force detected by the N force sensors, this may enable the EDT 320 to effectively "correct" the at least one event determination $E(n)$ so that the at least one transformed event determination $E(n)^T$ compensates for non-linear operation of the N force sensors 130.

For example, the EDT 320 may be configured to transform the at least one untransformed event determination $E(n)$ into the at least one transformed event determination $E(n)^T$ based on an event-determination transform function and the reference signal, the event-determination transform function being a function of the reference signal. Based on the graphs in FIGS. 9 and 10 for example, the event-determination transform function may be configured based on sensor characterisation data (or a stored characterisation function or model derived from sensor characterisation data) to enable a transform from the untransformed event determinations $E(n)$ to the transformed event determinations $E(n)^T$ based on the reference signal.

The sensor characterisation data may for example define or describe the non-linear operation of the N force sensors 130 as mentioned earlier. The event-determination transform may also define or describe the intended operation of the determiner, or the dependence of the event determinations $E(n)$ on the non-linear operation of the N force sensors 130.

Thus, the EDT 320 may be configured, optionally based on stored sensor characterisation data or a stored characterisation function or model derived from sensor characterisation data (accessible by the EDT 320), to transform the at least one untransformed event determination $E(n)$ into the at least one transformed event determination $E(n)^T$ to reduce the configuration-related difference and/or a difference between the at least one transformed event determination $E(n)^T$ and a corresponding at least one untransformed event determination $E(n)$ expected when the reference signal has the configuration value in respect of which the classifier is operating.

As already mentioned, where the determiner 300A has the CRT 310 the classifier 200A need not have the CRT 220, and vice versa. Similarly, it may be that only one of the SST 210, CRT 220, CRT 310, and EDT 320 is provided. As another example, it may be that only two of the SST 210, CRT 220, CRT 310, and EDT 320 are provided, and that between them they share the task of predistortion/correction.

Further, although the SST 210 and CRT 220 are shown as part of the classifier 200A, one or both of them may be provided as external units and used in conjunction with the classifier 200. Similarly, although the CRT 310 and EDT 320 are shown as part of the determiner 300A, one or both of them may be provided as external units and used in conjunction with the determiner 300.

Still further, any or all of the SST 210, CRT 220, CRT 310, and EDT 320 may be considered part of the controller 400 or to have their functionality at least partly provided within the controller 400. The division between units/modules in FIGS. 6, 11 and 12 may thus be considered schematic and not restrictive.

As mentioned earlier, the classifier 200 may be configured for operation at at least one configuration (e.g. calibration or training) value of the reference signal. One way to deal with e.g. non-linear operation of force sensors 130 is to reconfigure the classifier 200 for different values of ranges of the reference signal (i.e. for different applied forces). This may be considered equivalent to using different classifiers for different values of ranges of the reference signal (i.e. for different applied forces), where each classifier is configured for a different one of those ranges. Put another way, there may be more than one configuration (e.g. calibration or training) value of the reference signal in respect of which the classifier 200 is configured (e.g. calibrated or trained) for operation.

For example, looking back at FIG. 6, the classifier 200 may be configured to generate the classification results $CR(n)$ based on the sensor samples $SS(n)$ differently for at least two different values of the reference signal to reduce the configuration-related difference and/or a difference, being a classifier-related difference, between the classification results $CR(n)$ and corresponding classification results $CR(n)$ expected when the reference signal has the configuration value in respect of which the classifier is operating. In some arrangements, the classifier 200 is configured to operate in a plurality of different modes of operation, the classification operations performed by the classifier 200 being different in the different modes of operation. In such arrangements, the classifier 200 is configured to selectively operate in one of the modes of operation in dependence upon the reference signal to reduce the configuration-related difference and/or the classifier-related difference.

For example, the classifier 200 may be configured, for each of a plurality of discrete value ranges of the reference signal corresponding to the plurality of modes of operation respectively, to operate in the one of the modes of operation in whose discrete value range a current value of the reference signal lies. Each mode of operation may then be configured (e.g. calibrated or trained) for operation at a different configuration value of the reference signal, with discrete value range comprising its configuration value. The discrete value ranges may be non-overlapping ranges. The discrete value ranges may be adjoining ranges.

Figure 13:
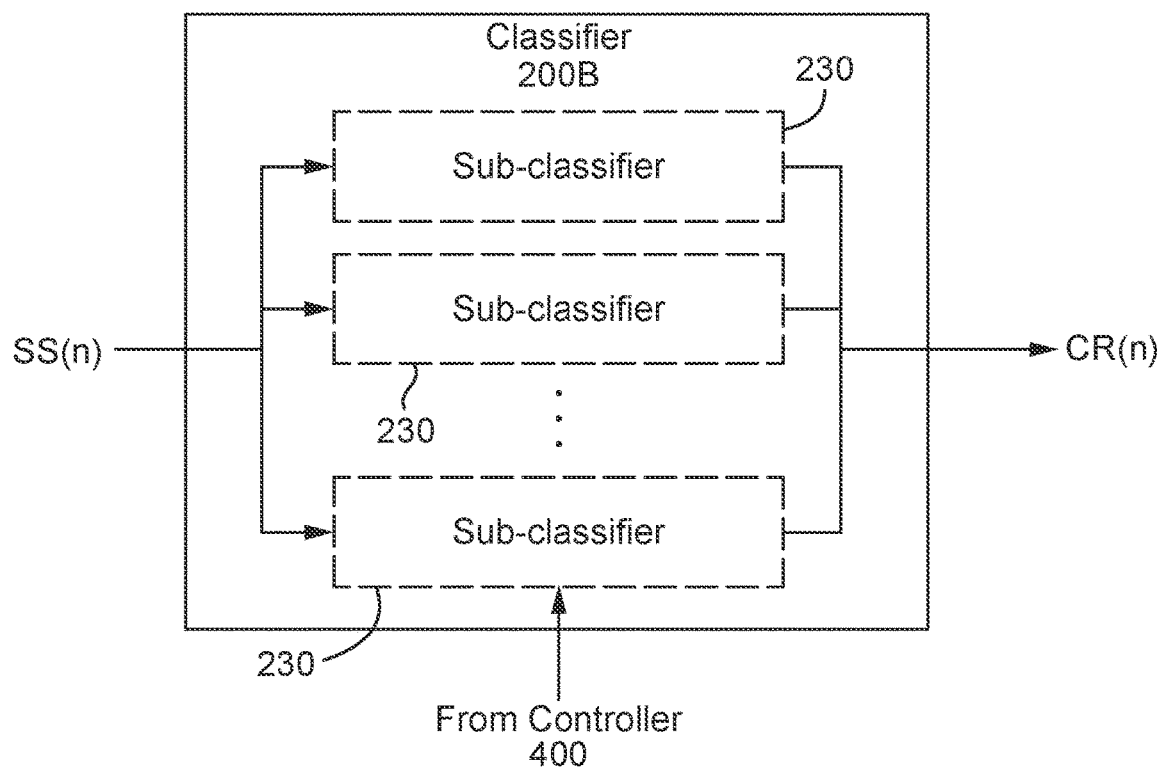
FIG. 13 is a schematic diagram of a classifier, being an implementation of the classifier of FIG. 6.

FIG. 13 is a schematic diagram of a classifier 200B being an implementation of the classifier 200. The classifier 200B may therefore be employed in place of the classifier 200. The classifier 200B is shown as comprising a plurality of sub-classifiers 230, and these may be configured to operate in the plurality of different modes of operation respectively.

The sub-classifiers 230 are connected to receive the sensor samples SS(n) and collectively generate the classification results CR(n). Each sub-classifier 230 is configured (e.g. calibrated or trained) for operation at a different configuration value of the reference signal. The classifier 200B is configured, when operating in a given one of the modes of operation as described above, to selectively operate the corresponding one of the sub-classifiers 230. In this way, the generated classification results CR(n) are generated by the corresponding one of the sub-classifiers which is operating.

As above, the classification system 180 has been described with multiple force sensors 130 in mind for convenience, however it will be recalled that there may be only one force sensor 130, i.e. N=1. Of course, it may be preferable to have more than two force sensors 130, i.e. N≥3, or N≥4, or N≥8 as examples. Each sensor signal is indicative of an applied force, and with multiple sensor signals more information concerning an applied force may be obtained. As in FIGS. 2 and 3, the force sensors 130 may be arranged to detect an applied force corresponding to a press of at least one virtual button, and each target event (or one or more target events) may correspond to a press of a virtual button.

The classification system 180 may be considered a sensor system, for example when including the force sensors 130. The host device 100, having the classification system 180, may itself be considered a classification system or a sensor system.

In the above examples, looking at FIG. 6, focus has been placed on interaction between the controller 400 and the classifier 200 and/or determiner 300. It will be appreciated that although the controller 400 is shown controlling both the classifier 200 and the determiner 300 it may control only one of them. Further, although the controller 400 is shown receiving many input signals, in different arrangements different subsets of those input signals (including a single input signal) may be received by the controller 400.

Further, in some arrangements the classification system 180 may be provided without the controller 400. For example the determiner 300 of FIG. 6 may be configured to receive a stream of (series of) classification results CR(n), corresponding to a stream of candidate sensor samples SS(n), and output a series of or stream of (corresponding) event determinations E(n), without requiring any control by the controller 400. Event determinations E(n) may each be based on a plurality of classification results CR(n), for example a plurality of consecutive classification results CR(n). The determiner may output at least one event determination based on the classification results CR(n).

As above, the determiner 300 in one arrangement may be a state machine. In this respect, the classifier (e.g. classifier 200 or 200ML) may be configured, for each of a series of candidate sensor samples SS(n), to perform a classification operation based on the N sample values concerned and generate a classification result CR(n) which labels the candidate sensor sample as indicative of a defined target event (of a plurality of possible defined target events, at least one of which may correspond to an anomalous user input), thereby generating a series of classification results CR(n) corresponding to the series of candidate sensor samples SS(n), respectively.

The determiner (taking the example of a state machine, such as a finite state machine) 300 may be configured to transition between defined states based on the series of classification results CR(n), i.e. without an additional input from the controller 400. At least one state may indicate that the defined target event occurred. The determiner 300 may be configured to output a signal indicating a current state of the state machine and/or indicating when the current state indicates that the defined target event occurred.

As an example, the determiner 300 may be configured to indicate with the event determinations E(n) that a particular virtual button is pressed only if the button classifications CR(n) remain stable (i.e. classify the sensor samples as corresponding to the same virtual button press) for R consecutive sample times, as described earlier. R may typically be a small number that can optionally be adjusted to trade off robustness for latency in the identification of a button press. When a magnitude threshold is also used as described above, this may correspond to the force also needing to be above the magnitude threshold, for the R consecutive sample times. This may increase system robustness, akin to "debouncing".

As another example, in some arrangements the classification system 180 may be provided without the determiner 300. For example, the controller 400 may be configured to control the classifier 200 based on one or more controller input signals. In this respect, the classifier may be implemented as the classifier 200A or 200B, with the controller 400 controlling the classifier concerned as described earlier.

As another example, looking at FIG. 11, the SST 210 (perhaps in combination with the controller 400) may be provided separately. That is, a sensor sample transformer (corresponding to the SST 210) may be provided for use in a classification system such as system 180, recalling that the classifier 200 may be configured for operation at at least one configuration value of a reference signal. Such a sensor sample transformer may be configured, based on a current value of the reference signal, to generate transformed sensor samples $SS(n)^T$ by transforming the untransformed sensor samples SS(n) to reduce a difference between, on the one hand, the transformed sensor samples $SS(n)^T$ and/or the classification results CR(n) generated therefrom, and, on the other hand, corresponding untransformed sensor samples SS(n) and/or classification results CR(n), respectively, expected when the reference signal has the configuration value in respect of which the classifier is operating. The classifier 200 may then be configured, for each of the series of candidate sensor samples SS(n), to perform the classification operation based on the corresponding transformed sensor sample $SS(n)^T$.

As another example, looking at FIGS. 11 and 12, the CRT 220 and/or 310 (perhaps in combination with the controller 400) may be provided separately. That is, a classification result transformer (corresponding to the CRT 220 and/or 310) may be provided for use in a classification system such as system 180, recalling that the classifier 200 may be configured for operation at at least one configuration value of a reference signal. Such a classification result transformer may be configured, based on a current value of the reference signal, to generate transformed classification results $CR(n)^T$ by transforming the untransformed classification results CR(n) to reduce a difference between the transformed classification results $CR(n)^T$ and corresponding untransformed classification results CR(n) expected when the reference signal has the configuration value in respect of which the classifier is operating. The determiner 300, if provided, may then be configured to operate based on the transformed classification results $CR(n)^T$ as described earlier.

As another example, looking at FIG. 12, the EDT 320 (perhaps in combination with the controller 400) may be provided separately. That is, an event determination transformer may be provided for use in a classification system such as system 180, recalling that the classifier 200 may be configured for operation at at least one configuration value of a reference signal. Such an event determination transformer may be configured, based on a current value of the reference signal, to generate at least one transformed event determination $E(n)^T$ by transforming the at least one untransformed event determination $E(n)$ to reduce a difference between the at least one transformed event determination $E(n)^T$ and a corresponding at least one untransformed event determination $E(n)$ expected when the reference signal has the configuration value in respect of which the classifier is operating.

As another example, looking at FIGS. 11 and 12, a combination of two or more of the SST 210, CRT 220, CRT 310, and EDT 320 may be provided separately and referred to as a combination transformer. Merely as an example, considering the SST 210 and CRT 220, there may be provided a combination transformer for use in a classification system such as system 180, recalling that the classifier 200 may be configured for operation at at least one configuration value of a reference signal. Such a combination transformer may be configured, based on a current value of the reference signal, to generate transformed sensor samples $SS(n)^T$ by transforming the untransformed sensor samples $SS(n)$ and/or to generate transformed classification results $CR(n)^T$ by transforming the untransformed classification results $CR(n)$ to reduce a difference between, on the one hand, the transformed sensor samples $SS(n)^T$ and/or the transformed classification results $CR(n)^T$ generated therefrom, and, on the other hand, corresponding untransformed sensor samples $SS(n)$ and/or untransformed classification results $CR(n)$, respectively, expected when the reference signal has the configuration value in respect of which the classifier is operating. The classifier 200 may then be configured, for each of the series of candidate sensor samples $SS(n)$, to perform the classification operation based on the corresponding transformed sensor sample $SS(n)^T$. The determiner 300, if provided, may then be configured to operate based on the transformed classification results $CR(n)^T$ as described earlier.

Looking back at FIG. 6, the overall functionality (in the sense of inputs to outputs) of the classifier 200 may be performed using machine learning (ML) as mentioned earlier. The same may of course be true for the classifier 200A and/or 200B and/or 500. A trained classifier may be employed as the classifier 200, 200A, 200B or 500. Such a trained classifier may be generated by training a classifier (such as a neural network) using a computer-implemented method. Such a method may involve obtaining first and optionally also second training datasets of labelled training sensor samples.

The first training data set of labelled training sensor samples may be recorded (e.g. synthesised) for a number of defined target events, each of those training sensor samples labelled as corresponding to a respective one of the defined target events, wherein for each of the defined target events at least a plurality of those training sensor samples are labelled as corresponding to that target event. The second training dataset of labelled training sensor samples, provided for contrast, may be recorded (e.g. synthesised) for a number of events other than the defined target events, each of those training sensor samples labelled as corresponding to none of the defined target events.

Taking the classifier 200 as an example, the classifier may then be trained with the first and second training datasets (or e.g. just the first training dataset) using supervised learning. That is, each labelled training sensor sample constitutes an input-output pair, the input being the N sample values of that training sensor sample, and the output being the associated label (which corresponds to the intended or 'correct' classification result $CR(n)$ for that training sensor sample). The supervised learning then learns a function that maps an input to an output based on the example input-output pairs from the first and/or second training datasets. Thus, the trained classifier, rather than specifically considering rules or sample vectors $SV(n)$ as described earlier (see e.g. FIG. 7), is implemented as a machine learning (ML) classifier.

Typical classifiers that can be trained in this way, include a neural network classifier, a linear support vector machine (SVM) classifier, a quadratic, cubic, or higher order SVM classifier, a Gaussian SVM classifier, a linear discriminant classifier, a decision tree classifier, a bagged decision tree classifier, a boosted decision tree classifier. Many types of classifiers are known to those skilled in the art of machine learning classification. The above functionality does not depend on a particular choice of type of ML classifier.

In summary, there is disclosed herein a button press position detection sensor system that outputs a discrete physical location of a press wherein the system comprises (a) a classifier (e.g. classifier 200) that maps the signal from one or multiple force sensors to a button press location for individual time series sample/s; (b) a finite state machine (e.g. determiner 300) that takes the button press location from the classifier and provides a debounced location; and (c) a state transition criteria extractor block (e.g. controller 400) that provides additional inputs to the finite state machine.

The state transition criteria extractor may provide inputs to the finite state machine consisting of (a) features, including time and frequency domain, or associated classifier outputs based on these features, extracted from the signals from force sensors in the system; (b) features, including time and frequency domain, or associated classifier outputs based on these features, extracted from other sensors in the system, such as a temperature sensor, accelerometer, microphone or camera; and (c) feedback gathered from a human user, who is interacting with a device (e.g. host device 100), such as a mobile phone or tablet, through a GUI, voice interface or other feedback mechanism.

The finite state machine may transition states depending on (a) the current and prior debounced states of the system (e.g, event determinations $E(n)$); (b) the current and prior non-debounced states of the system (e.g. classification results $CR(n)$); and (c) outputs from the state transition criteria extractor block.

To correctly detect position using non-linear force sensors, (a) the finite state machine may be set to operate at a single force level by only allowing a state transition to occur when the force applied occurs over a narrow force range; or (b) the finite state machine may switch between different classifiers designed to operate at different force levels; or (c) the output of the classifier may be corrected by the finite state machine depending on the force level applied; or (d) the force signal inputted to the classifier may be corrected to remove non-linear effects.

The skilled person will recognise that the force sensors referred to herein are an example type of sensor, and that the techniques described herein may be applied to sensor systems having sensors in general. As such, references to a force sensor may be replaced by references to a sensor or to an electrical or electronic sensor or to an input transducer.

The skilled person will recognise that some aspects of the above described apparatus (circuitry) and methods may be embodied as processor control code, for example on a non-volatile carrier medium such as a disk, CD- or DVD- ROM, programmed memory such as read only memory (Firmware), or on a data carrier such as an optical or electrical signal carrier. For example, the classifier 200, 200A, 200B or 500, or the determiner 300 or 300A, or the controller 400 may be implemented as a processor operating based on processor control code. As another example, the controller 110 may be implemented as a processor operating based on processor control code.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

Some embodiments of the present invention may be arranged as part of an audio processing circuit, for instance an audio circuit (such as a codec or the like) which may be provided in a host device as discussed above. A circuit or circuitry according to an embodiment of the present invention may be implemented (at least in part) as an integrated circuit (IC), for example on an IC chip. One or more input or output transducers (such as a force sensor 130) may be connected to the integrated circuit in use.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office (USPTO) and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The present disclosure extends to the following numbered statements, which are useful for understanding the present invention.

A.

1. A classification system for classifying sensor samples in a sensor system, the sensor system comprising N force sensors each configured to output a sensor signal, where $N \geq 1$, each sensor sample comprising N sample values from the N sensor signals, respectively, the classification system comprising:

a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively;

a determiner configured to output at least one event determination based on the series of classification results; and a controller configured to control the classifier and/or the determiner based on one or more controller input signals.

2. The classification system according to statement 1, wherein the determiner is configured to determine each event determination based on a plurality of the classification results.

3. The classification system according to statement 1 or 2, wherein the determiner is configured to generate a series of event determinations corresponding to the series of classification results, optionally an event determination per classification result.

4. The classification system according to statement 3, wherein the determiner is configured to determine each event determination based on a corresponding plurality of consecutive classification results.

5. The classification system according to any of the preceding statements, wherein each controller input signal comprises, or is derived from, one or more of:
  the series of classification results, a current classification result and/or a preceding classification result;
  the at least one event determination, the series of event determinations, a current event determination and/or a preceding event determination;
  the N sensor signals, or at least one of the N sensor signals;
  at least one sensor signal obtained from another sensor of the sensor system such as a temperature sensor, accelerometer, microphone or camera;
  a control signal of the classification system; and
  a feedback signal input by a user in response to the N sensor signals, the classification results and/or the at least one event determination.

6. The classification system according to statement 5, wherein at least one controller input signal comprises a time-domain and/or frequency-domain feature extracted from a said sensor signal, control signal or feedback signal, or a combination thereof, optionally wherein at least one said extracted feature comprises a magnitude or a rate of change.

7. The classification system according to any of the preceding statements, wherein:
  the classifier is configured for operation at at least one configuration value of a reference signal, the reference signal comprising or derived from at least one controller input signal; and
  the controller is configured, based on a current value of the reference signal, and optionally based on stored sensor characterisation data or a stored characterisation function or model derived from sensor characterisation data, to control the classifier and/or the determiner to reduce a difference, being a configuration-related difference, between:
    the classification results and/or the at least one event determination; and
    corresponding classification results and/or a corresponding at least one event determination expected when the reference signal has the configuration value in respect of which the classifier is operating, optionally wherein:
  said reference signal is indicative of a factor affecting sensitivity of the N force sensors and/or of an applied force detected by the N force sensors; and/or
  said at least one configuration value is a calibration value and the classifier is calibrated for operation at the at least one calibration value, or said at least one configuration value is a training value and the classifier is trained for operation at the at least one training value.

8. The classification system according to statement 7, wherein the controller is configured to control the classifier and/or the determiner to reduce the configuration-related difference based on:
  a difference, being a reference-related difference, between the current value of the reference signal and the configuration value in respect of which the classifier is operating; and/or
  a control function and the reference signal, the control function being a function of the reference signal and optionally based on stored sensor characterisation data or a stored characterisation function or model derived from sensor characterisation data.

9. The classification system according to statement 7 or 8, wherein:
  said sensor samples are untransformed sensor samples;
  the classifier comprises a sensor sample transformer configured to generate transformed sensor samples by transforming the untransformed sensor samples;
  the classifier is configured, for each of the series of candidate sensor samples, to perform the classification operation based on the corresponding transformed sensor sample; and
  the controller is configured to control the sensor sample transformer based on the reference signal to reduce the configuration-related difference.

10. The classification system according to statement 9, wherein the sensor sample transformer is configured to transform the untransformed sensor samples into the transformed sensor samples based on a sensor-sample transform function and the reference signal, the sensor-sample transform function being a function of the reference signal.

11. The classification system according to statement 10, wherein:
  the sensor-sample transform function is configured, optionally based on stored sensor characterisation data or a stored characterisation function or model derived from sensor characterisation data, to transform the untransformed sensor samples into the transformed sensor samples to reduce the configuration-related difference and/or a difference, being a sensor-related difference, between:
  the transformed sensor signals; and
  corresponding untransformed sensor samples expected when the reference signal has the configuration value in respect of which the classifier is operating.

12. The classification system according to any of statements 7 to 11, wherein the classifier is configured to generate the classification results based on the sensor samples differently for at least two different values of the reference signal to reduce the configuration-related difference and/or a difference, being a classifier-related difference, between:
  the classification results; and
  corresponding classification results expected when the reference signal has the configuration value in respect of which the classifier is operating.

13. The classification system according to statement 12, wherein:
  the classifier is configured to operate in a plurality of different modes of operation, the classification operations performed by the classifier being different in the different modes of operation; and
  the classifier is configured to selectively operate in one of the modes of operation in dependence upon the reference signal to reduce the configuration-related difference and/or the classifier-related difference.

14. The classification system according to statement 13, wherein the classifier is configured, for each of a plurality of discrete value ranges of the reference signal corresponding to the plurality of modes of operation respectively, to operate in the one of the modes of operation in whose discrete value range a current value of the reference signal lies.

15. The classification system according to statement 14, wherein:
    each mode of operation is configured for operation at a different configuration value of the reference signal; and
    for each mode of operation, its discrete value range comprises its configuration value,
    optionally wherein:
        the discrete value ranges are non-overlapping ranges; and/or
        the discrete value ranges are adjoining ranges.

16. The classification system according to any of statements 13 to 15, wherein:
    the classifier comprises a plurality of sub-classifiers, configured to operate in said plurality of different modes of operation respectively; and
    the classifier is configured, when operating in a given one of the modes of operation, to selectively operate the corresponding one of the sub-classifiers (e.g. so that the generated classification results are generated by the corresponding one of the sub-classifiers).

17. The classification system according to any of statements 7 to 16, wherein:
    said classification results are untransformed classification results;
    the classifier and/or the determiner comprises a classification result transformer configured to generate transformed classification results by transforming the untransformed classification results;
    the determiner is configured to output said at least one event determination based on the series of transformed classification results; and
    the controller is configured to control the classification result transformer based on the reference signal to reduce the configuration-related difference.

18. The classification system according to statement 17, wherein the classification result transformer is configured to transform the untransformed classification results into the transformed classification results based on a classification-result transform function and the reference signal, the classification-result transform function being a function of the reference signal.

19. The classification system according to statement 18, wherein:
    the classification-result transform function is configured, optionally based on stored sensor characterisation data or a stored characterisation function or model derived from sensor characterisation data, to transform the untransformed classification results into the transformed classification results to reduce the configuration-related difference and/or a difference between:
        the transformed classification results; and
        corresponding untransformed classification results expected when the reference signal has the configuration value in respect of which the classifier is operating.

20. The classification system according to any of statements 7 to 19, wherein:
    said at least one event determination is an untransformed event determination;
    the determiner comprises an event determination transformer configured to generate at least one transformed event determination by transforming the at least one untransformed event determination; and
    the controller is configured to control the event determination transformer based on the reference signal to reduce the configuration-related difference.

21. The classification system according to statement 20, wherein the event determination transformer is configured to transform the at least one untransformed event determination into the at least one transformed event determination based on an event-determination transform function and the reference signal, the event-determination transform function being a function of the reference signal.

22. The classification system according to statement 21, wherein:
    the event-determination transform function is configured, optionally based on stored sensor characterisation data or a stored characterisation function or model derived from sensor characterisation data, to transform the at least one untransformed event determination into the at least one transformed event determination to reduce the configuration-related difference and/or a difference between:
    the at least one transformed event determination; and
    a corresponding at least one untransformed event determination expected when the reference signal has the configuration value in respect of which the classifier is operating.

23. The classification system according to any of the preceding statements, wherein:
    the determiner comprises a state machine configured to transition between defined states;
    each event determination is indicative of a current state of the state machine; and
    the state machine is configured to transition between its states based on the controller input signals.

24. The classification system according to statement 23, wherein:
    the classifier is configured to generate a confidence metric for each classification result; and
    the controller input signals comprise the confidence metrics, the confidence metric for the current classification result and/or the confidence metric for a preceding classification result.

25. The classification system according to statement 24, wherein each confidence metric indicates a degree of confidence in its classification result, and wherein the state machine is configured to require, for transitioning from a first state to a second state, a greater degree of confidence in relation to the second state to transition to the second state than in relation to the first state to remain in the first state.

26. The classification system according to any of statements 23 to 25, wherein the state machine is configured to implement hysteresis control in switching between states based on the series of classification results and/or their confidence metrics.

27. The classification system according to any of statements 23 to 26, wherein:
    the state machine defines permitted transitions between its states, and, for each permitted transition between its states, at least one transition criterion which if satisfied will trigger that transition of state; and
    each transition criterion is defined by one or more of said controller input signals.

28. The classification system according to statement 27, wherein:

the defined states comprise a pressed state, representative of a press of a virtual button defined in relation to the N force sensors; and a permitted transition into the pressed state defines as transition criteria that:

the controller input signals indicate that a magnitude of an applied force in a location corresponding to the virtual button transitions from below a non-press threshold to above a press threshold; and the classification results indicate that the applied force is at the location corresponding to the virtual button when the controller input signals indicate that the magnitude of the applied force in that location is substantially at, or within a defined configuration range of, a configuration force for which the classifier operation has been configured, optionally wherein:

the configuration range is between the non-press threshold and the press threshold; and/or the configuration range spans (only or up to or between) ±1% or ±5% or ±10% or ±20 of the configuration force.

29. The classification system according to any of statements 23 to 28, wherein the state machine is defined such that the determiner outputs an event determination which indicates that a given target event has been determined to have occurred if:

at least a threshold number of those classification results label their candidate sensor samples as indicative of the given target event; and/or the sensor samples for at least a threshold number of those classification results indicate that an applied force meets a defined criterion; and/or a transition between states of the state machine corresponding to a transition from a preceding event determination to the event determination which indicates that the given target event has been determined to have occurred is a permitted transition between the states of the state machine.

30. The classification system according to statement 29, wherein said threshold number of those classification results which label their candidate sensor samples as indicative of the given target event are consecutive classification results in the series of classification results.

31. The classification system according to statement 29 or 30, wherein said defined criterion comprises that the applied force exceeds a defined threshold level.

32. The classification system according to any of statements 23 to 31, wherein:

the state machine is a finite state machine or a deterministic finite state machine; and/or the state machine is implemented as a set of rules which define its states and permitted transitions between its states based on the one or more controller input signals.

33. The classification system according to any of the preceding statements, wherein:

N≥2, or N≥3, or N≥4, or N≥8; and/or each sensor signal is indicative of an applied force; and/or the force sensors of the sensor system are arranged to detect an applied force corresponding to a press of at least one virtual button, at least one target event corresponding to a press of a virtual button.

34. A sensor system or a host device, comprising:

the classification system according to any of the preceding statements; and the N force sensors.

B.

35. A classification system for classifying sensor samples in a sensor system, the sensor system comprising N force sensors each configured to output a sensor signal, where N≥1, each sensor sample comprising N sample values from the N sensor signals, respectively, the classification system comprising a classifier and a determiner, wherein:

the classifier is configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; and the determiner is configured to output at least one event determination based on the series of classification results, and to determine each event determination based on a plurality of the classification results.

C.

36. A classification system for classifying sensor samples in a sensor system, the sensor system comprising N force sensors each configured to output a sensor signal, where N≥1, each sensor sample comprising N sample values from the N sensor signals, respectively, the classification system comprising a classifier and a controller, wherein:

the classifier is configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; and the controller is configured to control the classifier based on one or more controller input signals.

D.

37. A sensor sample transformer for use in a classification system, the classification system for classifying sensor samples in a sensor system, the sensor system comprising N force sensors each configured to output a sensor signal, where N≥1, each sensor sample comprising N sample values from the N sensor signals, respectively, the classification system comprising:

a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively, wherein:

the classifier is configured for operation at at least one configuration value of a reference signal;

said sensor samples are untransformed sensor samples;

the sensor sample transformer is configured, based on a current value of the reference signal, to generate transformed sensor samples by transforming the untransformed sensor samples to reduce a difference between:

the transformed sensor samples and/or the classification results generated therefrom; and corresponding untransformed sensor samples and/or classification results, respectively, expected when the reference signal has the configuration value in respect of which the classifier is operating; and the classifier is configured, for each of the series of candidate sensor samples, to perform the classification operation based on the corresponding transformed sensor sample.

38. The sensor sample transformer according to statement 37, configured to generate the transformed sensor samples based on a difference between the current value of the reference signal and the configuration value in respect of which the classifier is operating.

39. The sensor sample transformer according to statement 37 or 38, configured to generate the transformed sensor samples based on stored sensor characterisation data or a stored characterisation function or model derived from sensor characterisation data.

40. The sensor sample transformer according to any of statements 37 to 39, wherein said reference signal is indicative of a factor affecting sensitivity of the N force sensors and/or of an applied force detected by the N force sensors.

41. A classification result transformer for use in a classification system, the classification system for classifying sensor samples in a sensor system, the sensor system comprising N force sensors each configured to output a sensor signal, where N≥1, each sensor sample comprising N sample values from the N sensor signals, respectively, the classification system comprising:
    a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively,
    wherein:
    the classifier is configured for operation at at least one configuration value of a reference signal;
    said classification results are untransformed classification results; and
    the classification result transformer is configured, based on a current value of the reference signal, to generate transformed classification results by transforming the untransformed classification results to reduce a difference between:
        the transformed classification results; and
        corresponding untransformed classification results expected when the reference signal has the configuration value in respect of which the classifier is operating.

42. The classification result transformer according to statement 41, configured to generate the transformed classification results based on a difference between the current value of the reference signal and the configuration value in respect of which the classifier is operating.

43. The classification result transformer according to statement 41 or 42, configured to generate the transformed classification results based on stored sensor characterisation data or a stored characterisation function or model derived from sensor characterisation data.

44. The classification result transformer according to any of statements 41 to 43, wherein said reference signal is indicative of a factor affecting sensitivity of the N force sensors and/or of an applied force detected by the N force sensors.

45. An event determination transformer for use in a classification system, the classification system for classifying sensor samples in a sensor system, the sensor system comprising N force sensors each configured to output a sensor signal, where N≥1, each sensor sample comprising N sample values from the N sensor signals, respectively, the classification system comprising:
    a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively; and
    a determiner configured to output at least one event determination based on the series of classification results,
    wherein:
    the classifier is configured for operation at at least one configuration value of a reference signal;
    said at least one event determination is an untransformed event determination; and
    the event determination transformer is configured, based on a current value of the reference signal, to generate at least one transformed event determination by transforming the at least one untransformed event determination to reduce a difference between:
        the at least one transformed event determination; and
        a corresponding at least one untransformed event determination expected when the reference signal has the configuration value in respect of which the classifier is operating.

46. The event determination transformer according to statement 45, configured to generate at least one transformed event determination based on a difference between the current value of the reference signal and the configuration value in respect of which the classifier is operating.

47. The event determination transformer according to statement 45 or 46, configured to generate at least one transformed event determination based on stored sensor characterisation data or a stored characterisation function or model derived from sensor characterisation data.

48. The event determination transformer according to any of statements 45 to 47, wherein said reference signal is indicative of a factor affecting sensitivity of the N force sensors and/or of an applied force detected by the N force sensors.

49. A combination transformer for use in a classification system, the classification system for classifying sensor samples in a sensor system, the sensor system comprising N force sensors each configured to output a sensor signal, where N≥1, each sensor sample comprising N sample values from the N sensor signals, respectively, the classification system comprising:
    a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively,
    wherein:
    the classifier is configured for operation at at least one configuration value of a reference signal;
    said sensor samples are untransformed sensor samples;
    said classification results are untransformed classification results;
    the combination transformer is configured, based on a current value of the reference signal, to generate transformed sensor samples by transforming the untransformed sensor samples and/or to generate transformed classification results by transforming the untransformed classification results to reduce a difference between:
the transformed sensor samples and/or the transformed classification results generated therefrom; and
corresponding untransformed sensor samples and/or untransformed classification results, respectively, expected when the reference signal has the configuration value in respect of which the classifier is operating; and the classifier is configured, for each of the series of candidate sensor samples, to perform the classification operation based on the corresponding transformed sensor sample.

E.

50. A classification system for classifying sensor samples in a sensor system, the sensor system comprising N force sensors each configured to output a sensor signal, where N≥1, each sensor sample comprising N sample values from the N sensor signals, respectively, the classification system comprising:
a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively;
a determiner configured to output at least one event determination based on the series of classification results; and
a controller configured to control the classifier and/or the determiner based on one or more controller input signals,
wherein:
the classifier is configured for operation at at least one configuration value of a reference signal, the reference signal comprising or derived from at least one controller input signal; and
the controller is configured, based on a current value of the reference signal, to control the classifier and/or the determiner to cause the determiner to output the at least one event determination based selectively or only on classification results generated when the current value of the reference signal is substantially at, or within a defined configuration range of, the configuration value in respect of which the classifier is operating,
optionally wherein the configuration range spans (only or up to or between) ±1% or ±5% or ±10% or ±20 of the configuration value.

The invention claimed is:

1. A classification system for classifying sensor samples in a sensor system, the sensor system comprising N force sensors each configured to output a sensor signal, where N≥1, each sensor sample comprising N sample values from the N sensor signals, respectively, the classification system comprising:
a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively;
a determiner configured to output at least one event determination based on the series of classification results; and
a controller configured to control the classifier and/or the determiner based on one or more controller input signals;
wherein:
the classifier is configured for operation at at least one configuration value of a reference signal, the reference signal comprising or derived from at least one controller input signal;
the controller is configured, based on a current value of the reference signal, to control the classifier and/or the determiner to reduce a difference, being a configuration-related difference, between:
the classification results and/or the at least one event determination; and
corresponding classification results and/or a corresponding at least one event determination expected when the reference signal has the configuration value in respect of which the classifier is operating;
said sensor samples are untransformed sensor samples;
the classifier comprises a sensor sample transformer configured to generate transformed sensor samples by transforming the untransformed sensor samples;
the classifier is configured, for each of the series of candidate sensor samples, to perform the classification operation based on the corresponding transformed sensor sample;
the controller is configured to control the sensor sample transformer based on the reference signal to reduce the configuration-related difference; and
the sensor sample transformer is configured to transform the untransformed sensor samples into the transformed sensor samples based on a sensor-sample transform function and the reference signal, the sensor-sample transform function being a function of the reference signal.

2. The classification system according to claim 1, wherein the determiner is configured to determine each event determination based on a plurality of the classification results.

3. The classification system according to claim 1, wherein each controller input signal comprises, or is derived from, one or more of:
the series of classification results, a current classification result and/or a preceding classification result;
the at least one event determination, the series of event determinations, a current event determination and/or a preceding event determination;
the N sensor signals, or at least one of the N sensor signals;
at least one sensor signal obtained from another sensor of the sensor system such as a temperature sensor, accelerometer, microphone or camera;
a control signal of the classification system; and
a feedback signal input by a user in response to the N sensor signals, the classification results and/or the at least one event determination.

4. The classification system according to claim 1, wherein:
the controller is configured, based on the current value of the reference signal, and based on stored sensor characterisation data or a stored characterisation function or model derived from sensor characterisation data, to control the classifier and/or the determiner to reduce said configuration-related difference, optionally wherein:
said reference signal is indicative of a factor affecting sensitivity of the N force sensors and/or of an applied force detected by the N force sensors; and/or
said at least one configuration value is a calibration value and the classifier is calibrated for operation at the at least one calibration value, or said at least one configuration value is a training value and the classifier is trained for operation at the at least one training value.

5. The classification system according to claim 4, wherein the controller is configured to control the classifier and/or the determiner to reduce the configuration-related difference based on:
a difference, being a reference-related difference, between the current value of the reference signal and the configuration value in respect of which the classifier is operating; and/or
a control function and the reference signal, the control function being a function of the reference signal and optionally based on stored sensor characterisation data or a stored characterisation function or model derived from sensor characterisation data.

6. The classification system according to claim 1, wherein:
the sensor-sample transform function is configured, optionally based on stored sensor characterisation data or a stored characterisation function or model derived from sensor characterisation data, to transform the untransformed sensor samples into the transformed sensor samples to reduce the configuration-related difference and/or a difference, being a sensor-related difference, between:
the transformed sensor signals; and
corresponding untransformed sensor samples expected when the reference signal has the configuration value in respect of which the classifier is operating.

7. The classification system according to claim 1, wherein the classifier is configured to generate the classification results based on the sensor samples differently for at least two different values of the reference signal to reduce the configuration-related difference and/or a difference, being a classifier-related difference, between:
the classification results; and
corresponding classification results expected when the reference signal has the configuration value in respect of which the classifier is operating.

8. The classification system according to claim 7, wherein:
the classifier is configured to operate in a plurality of different modes of operation, the classification operations performed by the classifier being different in the different modes of operation; and
the classifier is configured to selectively operate in one of the modes of operation in dependence upon the reference signal to reduce the configuration-related difference and/or the classifier-related difference.

9. The classification system according to claim 8, wherein the classifier is configured, for each of a plurality of discrete value ranges of the reference signal corresponding to the plurality of modes of operation respectively, to operate in the one of the modes of operation in whose discrete value range a current value of the reference signal lies.

10. The classification system according to claim 9, wherein:
each mode of operation is configured for operation at a different configuration value of the reference signal; and
for each mode of operation, its discrete value range comprises its configuration value, optionally wherein:
the discrete value ranges are non-overlapping ranges; and/or
the discrete value ranges are adjoining ranges.

11. The classification system according to claim 8, wherein:
the classifier comprises a plurality of sub-classifiers, configured to operate in said plurality of different modes of operation respectively; and
the classifier is configured, when operating in a given one of the modes of operation, to selectively operate the corresponding one of the sub-classifiers.

12. The classification system according to claim 1, wherein:
said classification results are untransformed classification results;
the classifier and/or the determiner comprises a classification result transformer configured to generate transformed classification results by transforming the untransformed classification results;
the determiner is configured to output said at least one event determination based on the series of transformed classification results; and
the controller is configured to control the classification result transformer based on the reference signal to reduce the configuration-related difference.

13. The classification system according to claim 1, wherein:
said at least one event determination is an untransformed event determination;
the determiner comprises an event determination transformer configured to generate at least one transformed event determination by transforming the at least one untransformed event determination; and
the controller is configured to control the event determination transformer based on the reference signal to reduce the configuration-related difference.

14. The classification system according to claim 1, wherein:
the determiner comprises a state machine configured to transition between defined states;
each event determination is indicative of a current state of the state machine; and
the state machine is configured to transition between its states based on the controller input signals.

15. The classification system according to claim 14, wherein:
the state machine defines permitted transitions between its states, and, for each permitted transition between its states, at least one transition criterion which if satisfied will trigger that transition of state; and
each transition criterion is defined by one or more of said controller input signals.

16. The classification system according to claim 15, wherein:
the defined states comprise a pressed state, representative of a press of a virtual button defined in relation to the N force sensors; and
a permitted transition into the pressed state defines as transition criteria that:
the controller input signals indicate that a magnitude of an applied force in a location corresponding to the virtual button transitions from below a non-press threshold to above a press threshold; and
the classification results indicate that the applied force is at the location corresponding to the virtual button when the controller input signals indicate that the magnitude of the applied force in that location is substantially at, or within a defined configuration range of, a configuration force for which the classifier operation has been configured, optionally wherein:
the configuration range is between the non-press threshold and the press threshold; and/or
the configuration range spans ±1% or ±5% or ±10% or ±20 of the configuration force.

17. The classification system according to claim 14, wherein the state machine is defined such that the determiner outputs an event determination which indicates that a given target event has been determined to have occurred if:
at least a threshold number of those classification results label their candidate sensor samples as indicative of the given target event; and/or
the sensor samples for at least a threshold number of those classification results indicate that an applied force meets a defined criterion; and/or
a transition between states of the state machine corresponding to a transition from a preceding event determination to the event determination which indicates that the given target event has been determined to have occurred is a permitted transition between the states of the state machine.

18. A classification system for classifying sensor samples in a sensor system, the sensor system comprising N force sensors each configured to output a sensor signal, where N≥1, each sensor sample comprising N sample values from the N sensor signals, respectively, the classification system comprising:
a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively;
a determiner configured to output at least one event determination based on the series of classification results; and
a controller configured to control the classifier and/or the determiner based on one or more controller input signals,
wherein:
the classifier is configured for operation at at least one configuration value of a reference signal, the reference signal comprising or derived from at least one controller input signal;
the controller is configured, based on a current value of the reference signal, to control the classifier and/or the determiner to reduce a difference, being a configuration-related difference, between:
the classification results and/or the at least one event determination; and
corresponding classification results and/or a corresponding at least one event determination expected when the reference signal has the configuration value in respect of which the classifier is operating,
the classifier is configured to generate the classification results based on the sensor samples differently for at least two different values of the reference signal to reduce the configuration-related difference and/or a difference, being a classifier-related difference, between:
the classification results; and
corresponding classification results expected when the reference signal has the configuration value in respect of which the classifier is operating.

19. A classification system for classifying sensor samples in a sensor system, the sensor system comprising N force sensors each configured to output a sensor signal, where N≥1, each sensor sample comprising N sample values from the N sensor signals, respectively, the classification system comprising:
a classifier configured, for each of a series of candidate sensor samples, to perform a classification operation based on the N sample values concerned and generate a classification result which labels the candidate sensor sample as indicative of a defined target event, thereby generating a series of classification results corresponding to the series of candidate sensor samples, respectively;
a determiner configured to output at least one event determination based on the series of classification results; and
a controller configured to control the classifier and/or the determiner based on one or more controller input signals,
wherein:
the classifier is configured for operation at at least one configuration value of a reference signal, the reference signal comprising or derived from at least one controller input signal;
the controller is configured, based on a current value of the reference signal, to control the classifier and/or the determiner to reduce a difference, being a configuration-related difference, between:
the classification results and/or the at least one event determination; and
corresponding classification results and/or a corresponding at least one event determination expected when the reference signal has the configuration value in respect of which the classifier is operating,
said at least one event determination is an untransformed event determination;
the determiner comprises an event determination transformer configured to generate at least one transformed event determination by transforming the at least one untransformed event determination; and
the controller is configured to control the event determination transformer based on the reference signal to reduce the configuration-related difference.

* * * * *